(12) United States Patent
Shiraishi

(10) Patent No.: US 7,839,735 B2
(45) Date of Patent: Nov. 23, 2010

(54) PHASE DIFFERENCE DETECTION APPARATUS, PHASE DIFFERENCE DETECTION METHOD, REPRODUCTION APPARATUS AND TRACKING CONTROLLING METHOD

(75) Inventor: Junya Shiraishi, Nagano (JP)

(73) Assignee: Sony Corporation (JP)

( * ) Notice: Subject to any disclaimer, the term of this patent is extended or adjusted under 35 U.S.C. 154(b) by 592 days.

(21) Appl. No.: 11/827,667

(22) Filed: Jul. 11, 2007

(65) Prior Publication Data

US 2008/0019469 A1  Jan. 24, 2008

(30) Foreign Application Priority Data

Jul. 14, 2006  (JP) .......................... P2006-194656

(51) Int. Cl.
G11B 5/09 (2006.01)
(52) U.S. Cl. .............. 369/47.31; 369/44.34; 369/44.39; 369/47.28
(58) Field of Classification Search .............. 369/59.17, 369/59.22, 44.34, 44.31, 44.39, 47.28, 59.16, 369/112.01, 124.05; 360/51
See application file for complete search history.

(56) References Cited

U.S. PATENT DOCUMENTS 5,774,290 A * 6/1998 Sasaki et al. ................... 360/51

| | | | | |
|---|---|---|---|---|
| 6,097,560 A * | 8/2000 | Tanaka et al. ................. 360/51 |
| 2002/0067677 A1* | 6/2002 | Miyashita et al. ......... 369/59.16 |
| 2003/0174621 A1* | 9/2003 | Takehara et al. ......... 369/59.22 |
| 2005/0122885 A1* | 6/2005 | Kanaoka ................. 369/124.05 |
| 2005/0128907 A1* | 6/2005 | Katsuki .................... 369/47.28 |
| 2006/0018236 A1* | 1/2006 | Matsumoto et al. .... 369/112.01 |
| 2006/0077830 A1* | 4/2006 | Kanaoka ................. 369/47.28 |

FOREIGN PATENT DOCUMENTS

JP    2006-053968    2/2006

* cited by examiner

*Primary Examiner*—Thuy N Pardo
(74) *Attorney, Agent, or Firm*—Lerner, David, Littenberg, Krumholz & Mentlik, LLP

(57) ABSTRACT

Herein disclosed a phase difference detection apparatus for detecting a phase difference between a first signal and a second signal, which may include a waveform equalization section configured to input the first and second signals as a target waveform and an input waveform, respectively, to perform a waveform equalization process using a FIR filter so that the input waveform may coincide with the target waveform; and a phase difference detection section configured to perform a predetermined calculation based on predetermined tap coefficients of the FIR filter in the waveform equalization section to calculate an asymmetric component of the tap coefficients of the FIR filter thereby to detect the phase difference between the first and second signals.

10 Claims, 13 Drawing Sheets

WITHOUT PHASE DIFFERENCE
→WITHOUT TRACK DISPLACEMENT

WITH PHASE DIFFERENCE
→WITH TRACK DISPLACEMENT
(DISPLACED TO DETECTORS B, C SIDE)

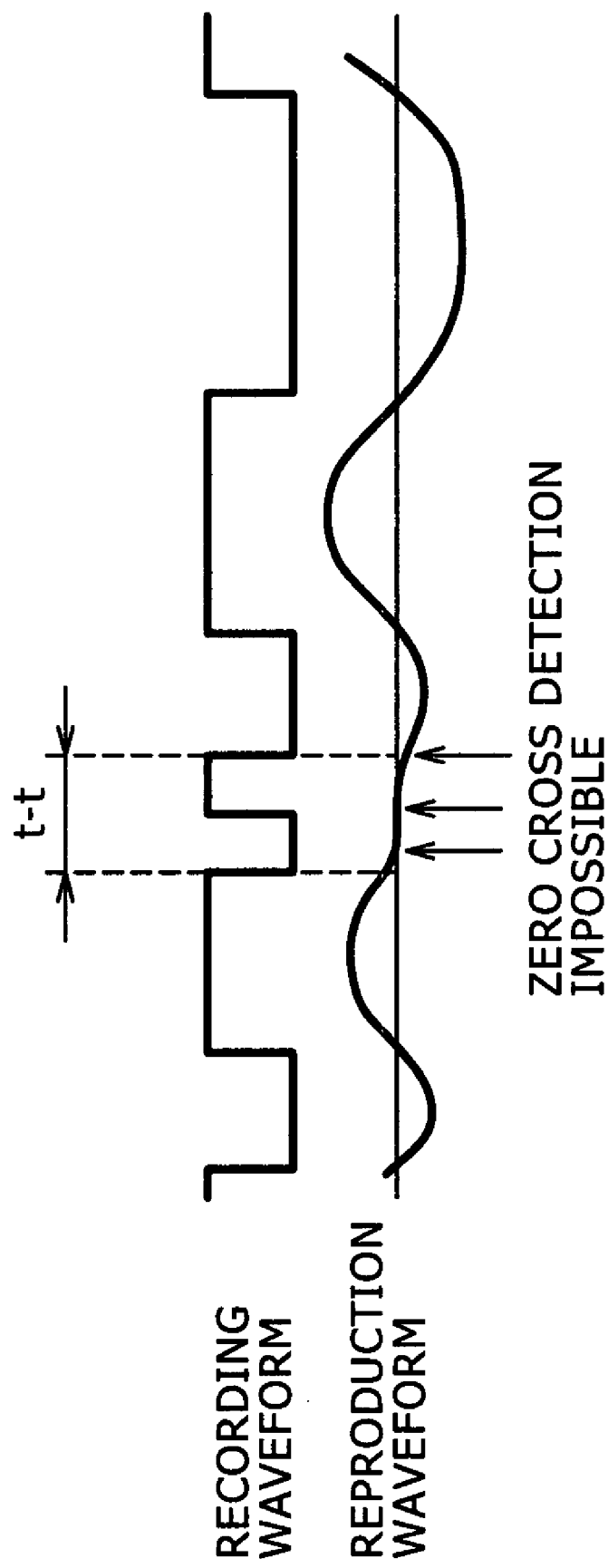

PHASE DIFFERENCE DETECTION APPARATUS, PHASE DIFFERENCE DETECTION METHOD, REPRODUCTION APPARATUS AND TRACKING CONTROLLING METHOD

CROSS-REFERENCE TO RELATED APPLICATIONS

This application claims priority from Japanese Patent Application No. JP 2006-194656 filed in the Japanese Patent Office on Jul. 14, 2006, the entire content of which is incorporated herein by reference.

BACKGROUND OF THE INVENTION

1. Field of the Invention

This invention relates to a phase difference detection apparatus and method for detecting the phase difference between two input signals. The present invention relates also to a reproduction apparatus for performing at least reproduction for an optical disk recording medium and a tracking controlling method for such a reproduction apparatus as just mentioned.

2. Description of the Related Art

In the related art, a DPD (Differential Phase Detection) method is widely known as a servo technique of an optical disk recording medium such as a DVD (Digital Versatile Disc), a BD (Blu-ray Disc: registered trademark) and so forth. The DPD method utilizes the fact that a phase difference appears between detection signals from a detector including at least two detection elements when a laser spot is displaced from the center position of a track on an optical disk recording medium.

In particular, according to an existing DPD method, generally such a four-element detector 11 as shown in FIG. 2 is used to detect the phase difference between sum components (A+C, B+D) of detection signals from the [detector element A, detector element C] and the [detector element B, detector element D] which are individually positioned at diagonal positions.

FIGS. 12A and 12B illustrate the relationships between the phase difference between two signals A+C and B+D and the track displacement in such a DPD method as described above.

It is to be noted that FIGS. 12A and 12B illustrate the relationship between the waveform A+C and the waveform B+D and the relationships between the phase relationship between the waveforms and the track displacement where, in the detector, the detector elements A and D and the detector elements B and C are arranged in order in a disk rotation direction (track longitudinal direction) and the detector elements A and B and the detector elements D and C are arranged in order in a tracking controlling direction (track lateral direction) as in the case of the four-element detector 11 shown in FIG. 2.

As shown in FIG. 12A, a state wherein no phase difference exists between the waveforms A+C and B+D is a state wherein no track displacement exists (that is, a just tracking state).

On the other hand, a state wherein a phase difference appears between the waveforms as seen in FIG. 12b is a state wherein some track displacement appears (that is, a state wherein a laser spot is displaced from the track center). For example, where the phase of the waveform A+C advances with respect to that of the waveform B+D as shown in FIG. 12B, the laser spot is displaced to the side on which the detector elements B and C shown in FIG. 2 are formed.

Further, though not shown, where the phase of the waveform B+D advances with respect to that of the waveform A+C, the laser spot is displaced to the side on which the detector elements A and D are formed.

FIG. 13 shows an example of a configuration of an existing tracking error signal production section 50 ready for the case wherein such a four-element detector 11 as described above is used.

First, an addition result A+C of the detection signals from the detector elements A and C in the four-element detector 11 shown in FIG. 2 and another addition result B+D of the detection signals from the detector elements B and D are inputted to the tracking error signal production section 50. The tracking error signal production section 50 includes, as a configuration for inputting the addition results A+C and B+D to produce a tracking error signal, equalizers 51a and 51b, zero-cross timing detection sections 52a and 52b, a phase difference comparison section 53, low-pass filters 54a and 54b, and a differential amplifier 55.

As seen in FIG. 13, the addition result A+C is inputted to the equalizer 51a, by which high-frequency components thereof are emphasized. Then, the resulting addition result A+C is supplied to the zero-cross timing detection section 52a to detect the zero-cross timing thereof.

Further, similarly to the addition result A+C, the addition result B+D is inputted to the equalizer 51b, by which high-frequency components thereof are emphasized. Then, the resulting addition result B+D is supplied to the zero-cross timing detection section 52b to detect the zero-cross timing thereof.

The detection signals of the zero-cross timing detected by the zero-cross timing detection sections 52a and 52b are supplied to the phase difference comparison section 53. The phase difference comparison section 53 compares the zero-cross timing A+C supplied from the zero-cross timing detection section 52a and the zero-cross timing B+D supplied from the zero-cross timing detection section 52b with each other. Then, where the zero-cross timing A+C is earlier than the zero-cross timing B+D (that is, the phase A+C advances with respect to the phase B+D), a positive (+) pulse is outputted, but, where the zero-cross timing B+D is earlier than the zero-cross timing A+C (that is, the phase B+D advances with respect to the phase A+C), a negative (−) pulse is outputted.

The + pulse and the − pulse from the phase difference comparison section 53 are supplied to the low-pass filters 54a and 54b, respectively, as seen in FIG. 13. The low-pass filters 54a and 54b pass only low-frequency components of the input signals from the phase difference comparison section 53 and output the low-frequency components to the differential amplifier 55. The differential amplifier 55 calculates the difference between the input signals from the low-pass filters 54a and 54b and outputs a result of the calculation as a tracking error signal.

With such a configuration as described above, where the number of + pulses is relatively great in the output from the phase difference comparison section 53 (that is, where the ratio is high wherein the phase A+C advances), a tracking error signal having the + polarity is outputted from the differential amplifier 55. On the other hand, where the number of − pulses is relatively great (that is, where the ratio is high wherein the phase B+D advances), a tracking error signal having the − polarity is outputted from the differential amplifier 55.

In this manner, in the existing DPD method, the zero-cross timings of the signal components (in this instance, [A, C] and [B, D]) formed such that the phase difference appears in response to displacement of the laser spot from the track center are detected to obtain information of the phase difference and then the tracking error signal is produced based on the information of the phase difference.

It is to be noted that a related art is disclosed in Japanese Patent Laid-Open No. 2006-53968

SUMMARY OF THE INVENTION

However, such an existing DPD method as described above has the possibility that it may fail to generate a tracking error signal suitably as high densification of linear directional recording of an optical disk recording medium advances.

FIG. 14 illustrates a relationship between a signal waveform or recording waveform to be recorded on an optical disk recording medium and a reproduction waveform obtained by actually reproducing the signal recorded based on the recording waveform. If high densification of recording of the optical disk recording medium advances until the shortest mark length of a recording mark (pit) comes near (or more) to an optical cutoff point of a reproduction pickup, then the amplitude of the reproduction signal from the shortest mark indicated by a period t-t in FIG. 14 cannot be obtained sufficiently or cannot be obtained at all. Then, if the amplitude of the reproduction signal waveform is obtained insufficiently as described above, then a sufficient amplitude cannot be obtained also regarding the signal components A+C and B+D obtained based on the detection signals from the four-element detector similarly to the reproduction signal.

If the amplitude of the signal components A+C and B+D cannot be sufficiently obtained as described above, then also the detection accuracy of the zero-cross timings of the signal components degrades significantly. Then, as a result of the degradation of the detection accuracy, the phase difference between the phases A+C and B+D cannot be suitably detected by the existing tracking error signal production section 50 shown in FIG. 13 and the accuracy of the tracking error signal degrades significantly.

If the accuracy of the tracking error signal degrades, then also the accuracy of the tracking servo degrades, resulting in degradation of the reproduction performance.

Further, while the information of the phase difference is obtained based on the detection result of the zero-cross timings of the phases A+C and B+D by the existing DPD method as described above, in such a method as just described, the information of the phase difference between the two signals can be obtained only from the zero-cross timings. Therefore, increase of the speed and accuracy of the tracking servo control is disturbed.

Further, in the existing DPD method, equalizers (equalizers 51*a* and 51*b*) for shaping the waveforms of the signals A+C and B+D are provided in order to increase the detection accuracy of the zero-cross timings. Particularly, in the case of a high recording density, such equalizers as just described must be provided essentially and expansion of the circuit space for providing the equalizers and increase of the cost cannot be avoided.

According an embodiment of the present invention, there is provided a phase difference detection apparatus for detecting a phase difference between a first signal and a second signal which may include a waveform equalization section configured to input the first and second signals as a target waveform and an input waveform, respectively, to perform a waveform equalization process using a FIR filter so that the input waveform may coincide with the target waveform, and a phase difference detection section configured to perform a predetermined calculation based on predetermined tap coefficients of the FIR filter in the waveform equalization section to calculate an asymmetric component of the tap coefficients of the FIR filter thereby to detect the phase difference between the first and second signals.

According to another embodiment of the present invention, there is provided a reproduction apparatus for performing at least reproduction for an optical disk recording medium which may include a head section having an objective lens configured to act as an output end of laser light to the optical disk recording medium and an input end of reflected light from the optical disk recording medium, a detector having at least two detection elements and configured to detect the reflected light obtained through the objective lens, and a tracking mechanism configured to hold the objective lens for movement at least in a tracking direction, a waveform equalization section configured to input first and second signals produced based on detection signals of the detection elements of the head section as a target waveform and an input waveform, respectively, such that a phase difference occurs when a laser spot based on the laser light is displaced from the center position of a track on the optical disk recording medium, to perform a waveform equalization process using a FIR filter so that the input waveguide may coincide with the target waveform, a phase difference detection section configured to perform a predetermined calculation based on predetermined tap coefficients of the FIR filter in the waveform equalization section to calculate an asymmetric component of the tap coefficients of the FIR filter thereby to detect a phase difference between the first and second signals, and a tracking controlling section configured to control the tracking mechanism based on the asymmetric component calculated by the phase difference detection section.

If it is assumed here that a phase difference appears between the first and second signals, then a process for varying the phase of the first signal so as to conform to the phase of the second signal may be performed as the waveform equalization process, which may be performed using the FIR (Finite Impulse Response) filter so that the first signal (input waveform) and the second signal (target waveform) may coincide with each other as described above. In particular, as the tap coefficients which may be obtained as convergence values of the FIR filter as a result of such a process as described above, values for canceling the phase difference of the first signal with respect to the second signal may be obtained.

Where such tap coefficients of the FIR filter after convergence as just described are obtained, the phase difference between the input waveform and the target waveform may appear from the asymmetry of the tap coefficients. Accordingly, if the asymmetric component of the tap coefficients of the FIR filter of the waveform equalization section to which the first and second signals are inputted as the input waveform and the target waveform, respectively, is calculated as described above, then the phase difference between the first and second signals may be detected.

With the phase detection apparatus and the reproduction apparatus, the phase difference between two signals may be detected without detecting the zero-cross timings of the two signals.

Consequently, where the phase difference detection technique according to the present invention is applied to tracking control upon reproduction of an optical disk recording medium, for example, as in the reproduction apparatus and the tracking controlling method of the present invention, the phase difference between two signals may be detected appropriately also in a case wherein the reproduction signal amplitude cannot be obtained sufficiently as more as a result of increase of the linear directional recording density of the optical disk recording medium. Therefore, not only increase of the accuracy of a tracking error signal but also increase of the accuracy of tracking servo control can be implemented and also degradation of the reproduction performance can be suppressed.

Further, since the detection of the zero-cross timing of the two signals as described above need not be performed, information of the phase difference between the two signals may be obtained at all of sampling points other then the zero-cross timings, and as a result, increase of the speed of the tracking servo control may be implemented with respect to the conventional technique. Further, if the information of the phase difference at all of the sampling points other than the zero-cross timings can be obtained, then increase of the accuracy of the tracking servo control may be implemented.

Further, since the detection of zero-cross timings need not be performed in this manner, while an equalizer for shaping the waveform of a signal in order to increase the detection accuracy of zero-cross timing must be provided in the existing technique, an equalizer may need not be provided in the present invention. Consequently, reduction of the circuit space and the cost can be implemented in comparison with the existing circuit configuration for producing a tracking error signal.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 8 to 11A and 11B are block diagrams showing a configuration of production systems for a tracking error signal according to second to fifth embodiments of the present invention;

FIG. 14 is a waveform diagram illustrating a relationship between a recording waveform and a reproduction signal obtained by reproduction of a signal recorded on an optical disk recording medium based on the recording medium where the recording density is increased until the shortest mark length comes near to an optical cutoff point.

DETAILED DESCRIPTION

First Embodiment

Figure 1:
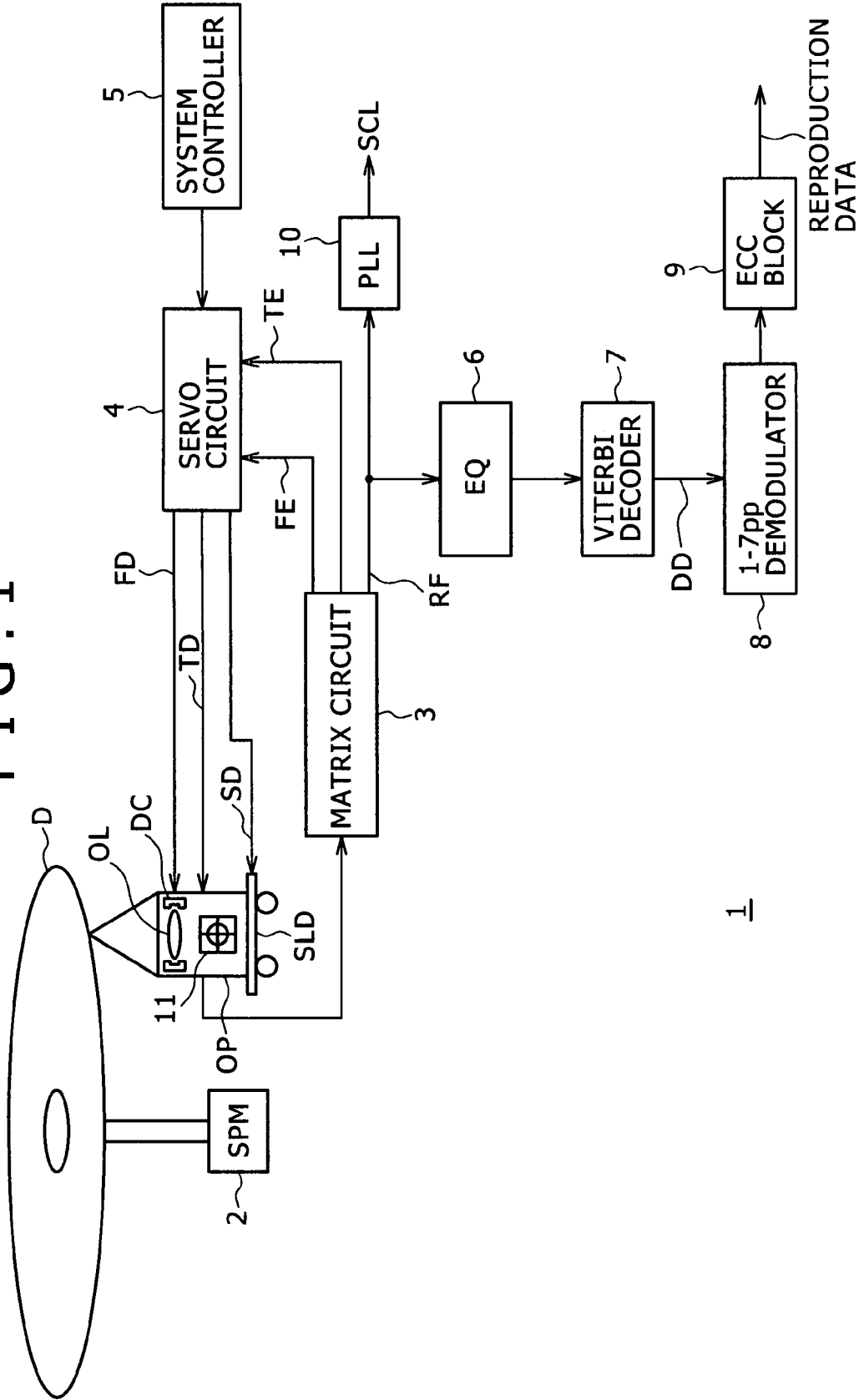
FIG. 1 is a block diagram showing an internal configuration of a reproduction apparatus to which the present invention is applied.

FIG. 1 shows an internal configuration of a reproduction apparatus 1 to which the present invention is applied. It is to be noted that FIG. 1 only shows a reproduction system and tracking and focusing servo systems of the reproduction apparatus 1 which relate to a signal recorded principally on an optical disk D.

The optical disk D is placed on a turntable (not shown) provided in the reproduction apparatus 1 and is driven to rotate in this state in accordance with a predetermined rotational driving method by a spindle motor (SPM) 2. The rotation of the spindle motor 2 is controlled by a spindle servo circuit not shown.

The optical disk D used in the reproduction apparatus 1 shown presumably is a ROM disk for reproduction only and may particularly be a high recording density disk such as a BD (Blu-ray Disc: registered trademark). Thus, reproduction of the optical disk D is performed, for example, in conditions that the numerical aperture NA of an objective lens OL hereinafter described is NA=0.85 and that the laser wavelength is 405 nm.

An optical pickup OP reads out a recorded signal from the optical disk D which is driven to rotate by the spindle motor 2 in such a manner as described above.

The optical pickup OP includes a laser diode (not shown) serving as a laser light source, an objective lens OL for condensing and irradiating laser light from the laser diode on a recording face of the optical disk D, and a four-element detector 11 for detecting reflected light based on the laser light irradiation from the optical disk D.

The objective lens OL is supported for movement in a tracking direction and a focusing direction by a biaxial mechanism DC. The biaxial mechanism DC includes a tracking coil and a focusing coil and drives the objective lens OL in the tracking direction and the focusing direction when a tracking drive signal TD and a focusing drive signal FD are supplied from a servo circuit 4 hereinafter described to the tracking coil and the focusing coil, respectively.

It is to be noted that the tracking direction (tracking control direction hereinafter described) is a lateral direction to a track formed on the optical disk D. In other words, the tracking direction is a direction perpendicular to the direction of rotation of the optical disk D.

Meanwhile, the focusing direction is a direction toward or away from the optical disk D.

Here, the arrangement of the detector elements A, B, C and D of the four-element detector 11 in the optical pickup OP is described with reference to FIG. 2.

In the four-element detector 11, the detector elements A and B and the detector elements C and D are positioned at different positions in a disk rotation direction or track longitudinal direction indicated by a one-sided arrow mark. Further, the detector elements A and D and the detector elements B and C are positioned at different positions in a tracking controlling direction or track lateral direction indicated by a double-sided arrow mark which is perpendicular to the disk rotation direction.

Referring back to FIG. 1, reflected light signals detected by the four-element detector 11 are supplied to a matrix circuit 3. The matrix circuit 3 produces a reproduction signal RF, a tracking error signal TE and a focusing error signal FE based on the reflected light signals.

It is to be noted that a configuration of a production system particularly for the tracking error signal TE in the matrix circuit 3 is hereinafter described.

The servo circuit 4 performs predetermined arithmetic operation such as filtering and loop gain processing for phase compensation and so forth for the tracking error signal TE and the focusing error signal FE from the matrix circuit 3 to produce a tracking servo signal TS and a focusing servo signal FS, respectively. Then, the servo circuit 4 produces a tracking drive signal TD and a focusing drive signal FD based on the tracking servo signal TS and the focusing servo signal FS and supplies the tracking drive signal TD and the focusing drive signal FD to a tracking coil and a focusing coil of the optical disk D in the optical pickup OP, respectively.

Since such operation of the servo circuit 4 as described above is performed, the four-element detector 11, matrix circuit 3, servo circuit 4 and optical disk D described above form a tracking servo loop and a focusing servo loop. As the tracking servo loop and the focusing servo loop are formed in this manner, such control is performed that a beam spot of laser light irradiated on the optical disk D traces a pit sequence (recording track) formed on the optical disk D and an appropriate focusing state (focus point) is maintained.

Further, the servo circuit 4 turns off the tracking servo loop in response to a track jump instruction from a system controller 5 hereinafter described and outputs a jump pulse as the tracking drive signal TD described hereinabove so that track jumping operation is performed.

The servo circuit 4 performs also pull-in control for turning on the tracking servo loop again to perform tracking servo control after such jumping operation or the like.

Further, the servo circuit 4 produces a thread drive signal SD based on accessing execution control from the system controller 5 to drive a thread mechanism SLD shown in FIG. 1. Though not particularly shown, the thread mechanism SLD includes a mechanism composed of a main shaft for holding the optical pickup OP, a thread motor, a transmission gear and so forth. The thread motor is driven in response to the thread drive signal SD to perform required sliding movement of the optical pickup OP.

A phase-locked loop (PLL) circuit 10 receives a reproduction signal RF produced by the matrix circuit 3 in such a manner as described above and produces a system clock SCL from the reproduction signal RF. The system clock SCL produced by the PLL circuit 10 is supplied as an operation clock to required components of the reproduction apparatus 1.

Meanwhile, the reproduction signal RF produced by the matrix circuit 3 is branched and supplied also to an equalizer (EQ) 6. The reproduction signal RF is waveform shaped by the equalizer 6 and supplied to a Viterbi decoder 7.

The equalizer 6 and the Viterbi decoder 7 cooperatively perform a binarization process which makes use of a bit detection method based on a PRML (Partial Response Maximum Likelihood). In other words, the equalizer 6 performs a waveform shaping process so as to obtain a reproduction signal RF which conforms to the PR class of the Viterbi decoder 7. Then, the Viterbi decoder 7 performs bit detection by a Viterbi detection method based on the reproduction signal RF waveform shaped in this manner to obtain a binary signal DD.

The binary signal DD obtained by the Viterbi decoder 7 is inputted to a 1-7pp demodulator 8. The 1-7pp demodulator 8 performs a process of demodulating the binary signal DD which is obtained as RLL(1, 7) PP (Parity Preserve/Prohibit, RLL: Run Length Limited) modulation data.

Then, the data RLL(1, 7) PP modulated in this manner is supplied to an ECC block 9, by which an error correction process, an deinterleave process and other necessary processes are performed therefor. As a result, reproduction data regarding application data recorded on the optical disk D are obtained.

Further, a system controller 5 is provided in the reproduction apparatus 1 in such a manner as seen in FIG. 1. The system controller 5 includes a CPU (Central Processing Unit), a ROM (Read Only Memory), a RAM (Random Access Memory) and so forth not shown. The system controller 5 controls the components of the reproduction apparatus 1 as the CPU operates in accordance with a program stored in the ROM or the like.

For example, as an example of control to be performed for the components of the reproduction apparatus 1, the system controller 5 issues such a track jump instruction as mentioned hereinabove to cause the servo circuit 4 to execute operation for implementing track jumping operation. Or, for example, in order to read out data recorded at a predetermined address of the optical disk D, the system controller 5 controls the servo circuit 4 to perform seek operation to the address as a target. In particular, the system controller 5 issues an instruction to the servo circuit 4 to execute access operation of the optical pickup OP to the target given as the designated address.

Figure 3:
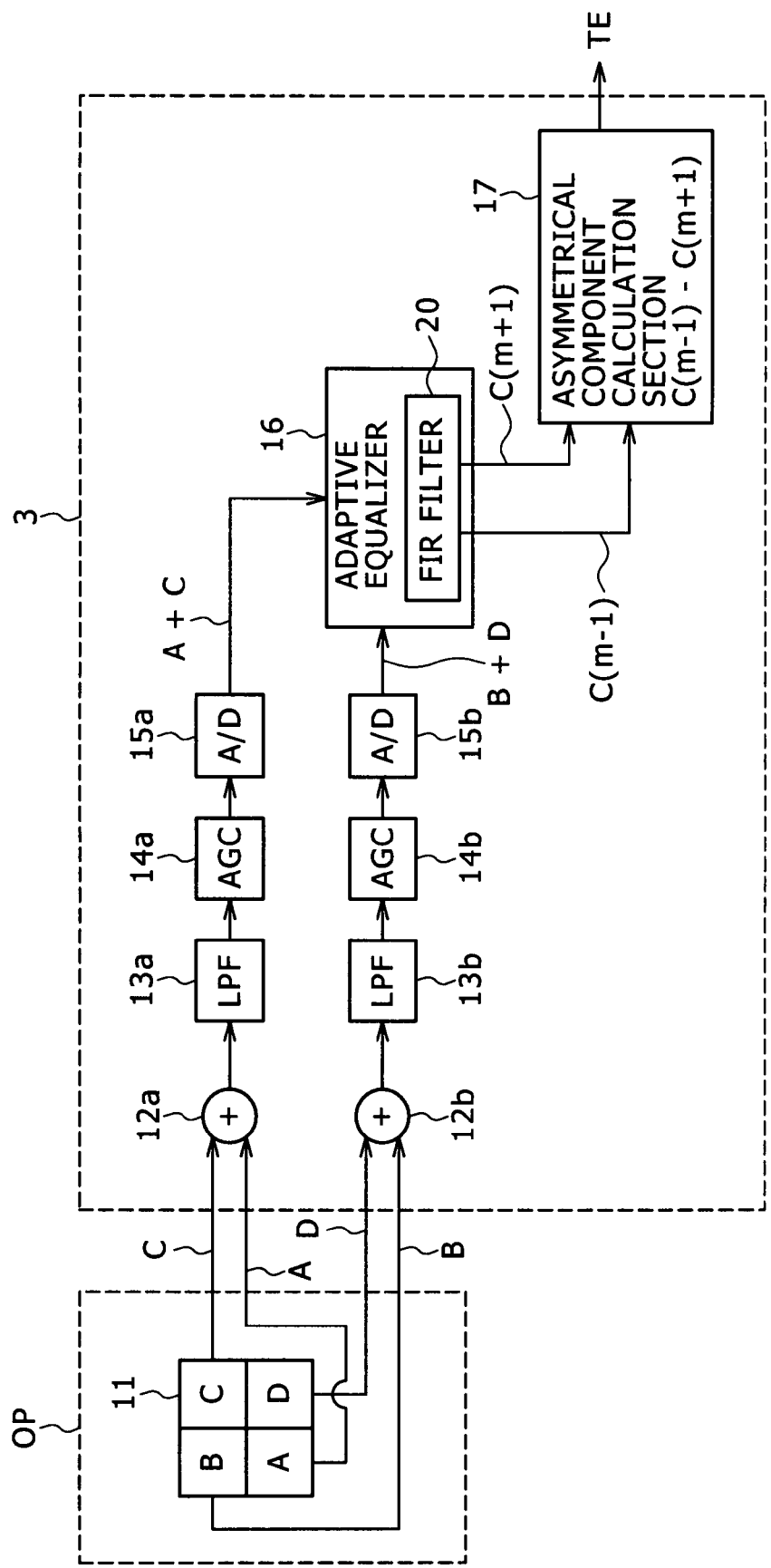
FIG. 3 is a block diagram showing a configuration of a production system for a tracking error signal according to a first embodiment of the present invention.

FIG. 3 shows a configuration particularly of the production system for the tracking error signal TE in the matrix circuit 3 shown in FIG. 1.

Also in FIG. 3, the four detector elements A, B, C and D of the four-element detector 11 in the optical pickup OP shown in FIG. 1 are shown. Four detection signals from the detector elements A, B, C and D are supplied to the matrix circuit 3.

In the matrix circuit 3, the production system for the tracking error signal TE includes adders 12a and 12b, low-pass filters (LPF) 13a and 13b, automatic amplitude adjusters (AGC) 14a and 14b, A/D (Analog/Digital) converters 15a and 15b, an adaptive equalizer 16 and an asymmetric component calculation section 17 as seen in FIG. 3.

The detection signals from the detector elements A and C from among the detection signals from the four-element detector 11 supplied in such a manner as described above are inputted to the adder 12a. Meanwhile, the detection signals from the detector elements B and D are inputted to the other adder 12b. Consequently, a sum signal A+C of the detection signals from the detector elements A and C is obtained by the adder 12a, and a sum signal B+D of the detection signals from the detector elements B and D is obtained by the adder 12b.

The sum signal A+C of the detection signals from the detector elements A and C obtained by the adder 13a undergoes a filtering process by the low-pass filter 13a and an automatic amplitude adjustment process by the automatic amplitude adjuster 14a and then is supplied to the A/D converter 15a. The A/D converter 15a performs sampling of the sum signal A+C and outputs digital data obtained by the sampling. The sum signal of the detection signals from the detector elements A and C after conversion into digital sample data by the low-pass filter 13a is hereinafter referred to as "signal A+C".

Similarly, also the sum signal B+D of the detection signals from the detector elements B and D obtained by the adder 12b undergoes a filtering process by the low-pass filter 13b and an automatic amplitude adjustment process by the automatic amplitude adjuster 14b and then is supplied to the A/D converter 15b. The A/D converter 15b performs sampling of the sum signal B+D and outputs digital data obtained by the sampling. The sum signal of the detection signals from the detector elements B and D after conversion into digital sample data by the low-pass filter 13b is hereinafter referred to as "signal B+D".

The signals A+C and B+D obtained by the A/D converters 15a and 15b are supplied to the adaptive equalizer 16.

The adaptive equalizer 16 includes a FIR (Finite Impulse Response) filter 20 as seen in FIG. 3. The FIR filter 20 is a FIR type adaptive equalizer or waveform equalizer which performs a waveform equalization process so that an input signal waveform coincides with a target signal waveform. In this instance, a popular LMS (Least Mean Square) algorithm is adopted for waveform equalization.

The signal A+C described hereinabove is inputted as a target signal waveform and the signal B+D described hereinabove is inputted as an input signal waveform to the adaptive equalizer 16.

Figure 4:
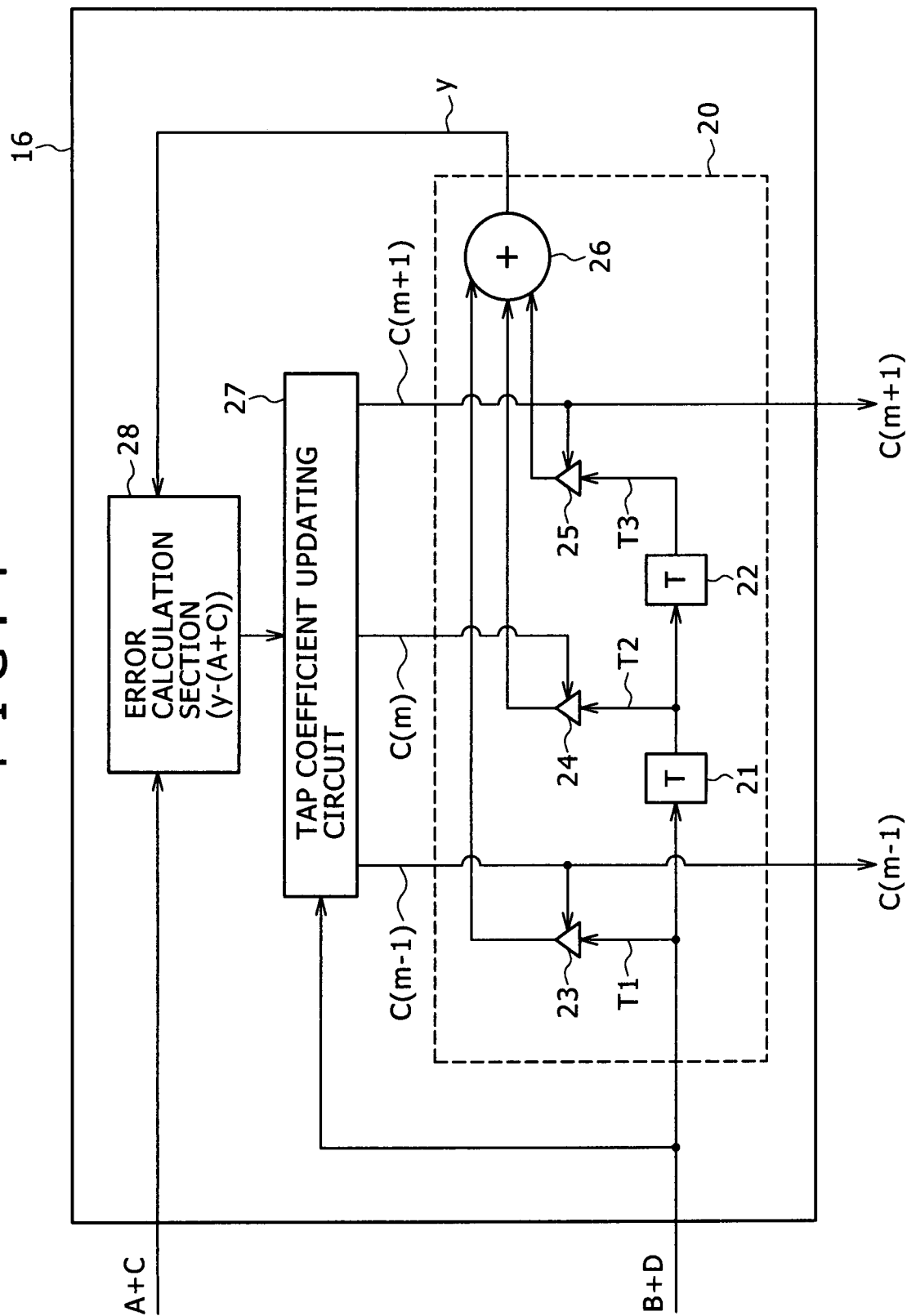
FIG. 4 is a block diagram showing an internal configuration of an adaptive equalizer provided in the production system for a tracking error signal shown in FIG. 3.

An internal configuration of the adaptive equalizer 16 is shown in FIG. 4.

Referring to FIG. 4, the adaptive equalizer 16 includes a tap coefficient updating circuit 27 and a error calculation section 28 in addition to the FIR filter 20.

The FIR filter 20 includes delay circuits 21 and 22 for the signal B+D as seen in FIG. 4. Thus, totaling three taps are formed for the signal B+D of the input waveform in this instance. The first tap for the signal B+D is referred to as tap T1; the second tap obtained after delay by the delay circuit 21 is referred to as tap T2; and the third tap obtained after delay by the delay circuit 22 is referred to as tap T3.

The FIR filter 20 includes multiplication circuits 23, 24 and 25 for providing tap coefficients to the individual taps T1, T2 and T3, respectively. The FIR filter 20 further includes an adder 26 for adding results of the multiplication by the multiplication circuits 23, 24 and 25 to obtain an output signal y of the FIR filter 20. The output signal y obtained by the adder 26 is supplied to an error calculation section 28.

The error calculation section 28 calculates an error between a target waveform and an output of the FIR filter 20. In particular, the signal A+C which is the target waveform in this instance and the output signal y outputted from the FIR filter 20 in such a manner as described above are supplied to the error calculation section 28. Then, the error calculation section 28 performs arithmetic operation, for example, in accordance with "y−(A+C)" to calculate an error between the signal A+C and the output signal y. A result of the calculation by the error calculation section 28 is supplied to the tap coefficient updating circuit 27.

The tap coefficient updating circuit 27 updates tap coefficients C to be provided to the taps T of the FIR filter 20 based on the value of the error calculated by the error calculation section 28 and the signal B+D as the input waveform. In this instance, the tap coefficient updating circuit 27 performs a process of updating the tap coefficients C so as to minimize the square mean value of errors calculated by the error calculation section 28 as the tap coefficient updating process based on the LMS algorithm described hereinabove.

From among the tap coefficients C to be provided to the taps T of the FIR filter 20 in this manner, the tap coefficient C to be provided to the central tap T2 is represented as tap coefficient C(m). Further, as the center is set as the mth tap coefficient C in this manner, the tap coefficient C to be provided to the tap T3 is represented as tap coefficient C(m+1), and the tap coefficient C to be provided to the tap T1 is represented as tap coefficient C(m−1).

As seen in FIG. 4, the tap coefficient C(m−1) from the tap coefficient updating circuit 27 is supplied to the multiplication circuit 23; the tap coefficient C(m) to the multiplication circuit 24; and the tap coefficient C(m+1) to the multiplication circuit 25. Each of the multiplication circuits 23, 24 and 25 multiplies the value of the tap T by the corresponding tap coefficient C which is successively updated by the adder 26 in this manner.

It is assumed here that, for example, the phase of the input waveform is displaced from that of the target waveform at the adaptive equalizer 16 in the form of an FIR type adaptive waveform equalizer having the configuration described above. In this instance, a waveform equalization process is performed so that the phase of the input waveform approaches the phase of the target waveform. As a result, each tap coefficient C obtained through such a waveform equalization process as described above has a value which reflects such phase displacement of the input waveform from the target waveform as described above.

More particularly, a component of such phase displacement between the input waveform and the target waveform appears as asymmetry of the tap coefficients C. In particular, in this instance, the tap coefficient C(m−1) and the tap coefficient C(m+1) should have a symmetrical positional relationship with respect to the central tap coefficient C(m). However, if, between the tap coefficients C(m−1) and C(m+1), the tap coefficient C(m+1) has a higher value, then this signifies that the preceding value is weighted rather than the current value and the weighting is performed in a direction in which the phase of the input waveform is delayed. From this, it can be recognized that, if one-sidedness to the tap coefficient C(m+1) side is detected as asymmetry in this manner, the phase of the input waveform is in a state advanced with respect to the phase of the target waveform.

Similarly, if the value of the tap coefficient C(m−1) is hither, then this signifies that the succeeding value is weighted rather than the current value and the weighting is performed in a direction in which the phase of the input waveform is advanced. Therefore, if one-sidedness to the tap coefficient C(m−1) side value is detected as asymmetry in this manner, then it can be recognized that the phase of the input waveform is in a state delayed with respect to that of the target waveform.

From the foregoing, it can be recognized that, in order to detect the phase difference between the target waveform and the input waveform, that is, the phase difference between the signal A+C and the signal B+D, an asymmetric component of the tap coefficients C of the FIR filter 20 should be calculated.

To this end, in the adaptive equalizer 16 shown in FIG. 4, the tap coefficient C(m−1) and C(m+1) to be set from the adder 26 to the multiplication circuits 23 and 25 are branched as seen in FIG. 4 and supplied to the asymmetric component calculation section 17 shown in FIG. 3.

Referring back to FIG. 3, the asymmetric component calculation section 17 performs, for example, arithmetic operation of C(m−1)−C(m+1) as seen in FIG. 3 to calculate an asymmetric component D of the tap coefficients C of the FIR filter 20. Then, the calculated asymmetric component D is outputted as the tracking error signal TE.

The tracking error signal TE as the asymmetric component outputted from the asymmetric component calculation section 17 is supplied to the servo circuit 4 as described hereinabove with reference to FIG. 1.

Here, the validity of use of an asymmetric component of the tap coefficients C calculated in such a manner as described above as the tracking error signal TE is described.

Figure 12A:
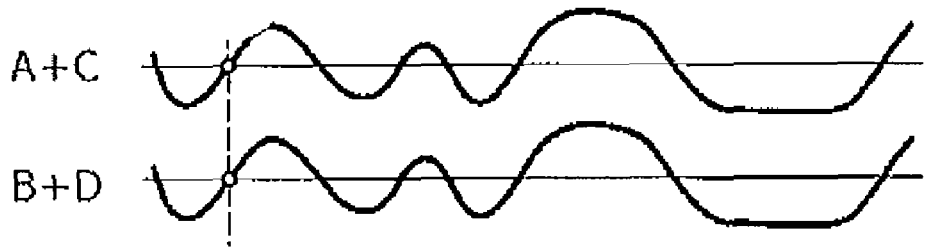
FIGS. 12A and 12B are waveform diagrams illustrating a relationship between the phase difference between two signals and the track displacement of a laser spot according to a PDP method.
Figure 12B:
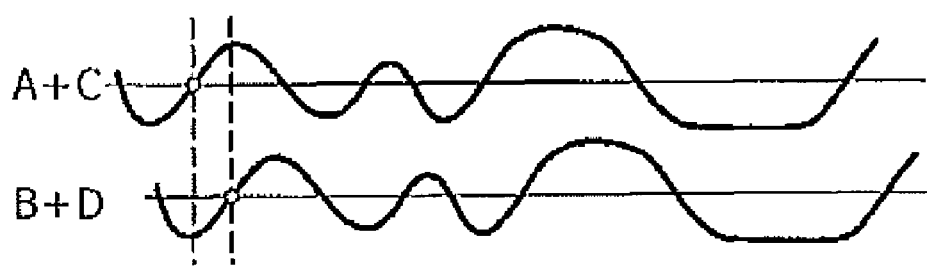

First, while, according to the foregoing description, the adaptive equalizer 16 receives the signal A+C and the signal B+D as the target waveform and the input waveform, respectively, the signals A+C and B+D are ideally different only in waveform shape as can be recognized with reference to FIG. 12.

Meanwhile, it is known that the tap coefficients of a FIR filter where only the phase is varied are represented by a sinc function (sinc(x)=sin(x)/x). More particularly, where the kth tap coefficient of a FIR filter is represented by C(k), a phase variation is represented by δ and the central tap T2 of the FIR filter is the mth tap, the kth tap coefficient C(k) can be represented by C(k)=sinc{(k−m)π+δ}.

Then, if it is assumed that C(k)=sinc{(k−m)π+δ} is satisfied in this manner, then where the asymmetric component calculated by the asymmetric component calculation section 17 shown in FIG. 3 is represented by D, it can be represented by the following expression (1):

$$D=C(m-1)-C(m+1)=\text{sinc}(-\pi+\delta)-\text{sinc}(\pi+\delta) \qquad (1)$$

Figure 5:
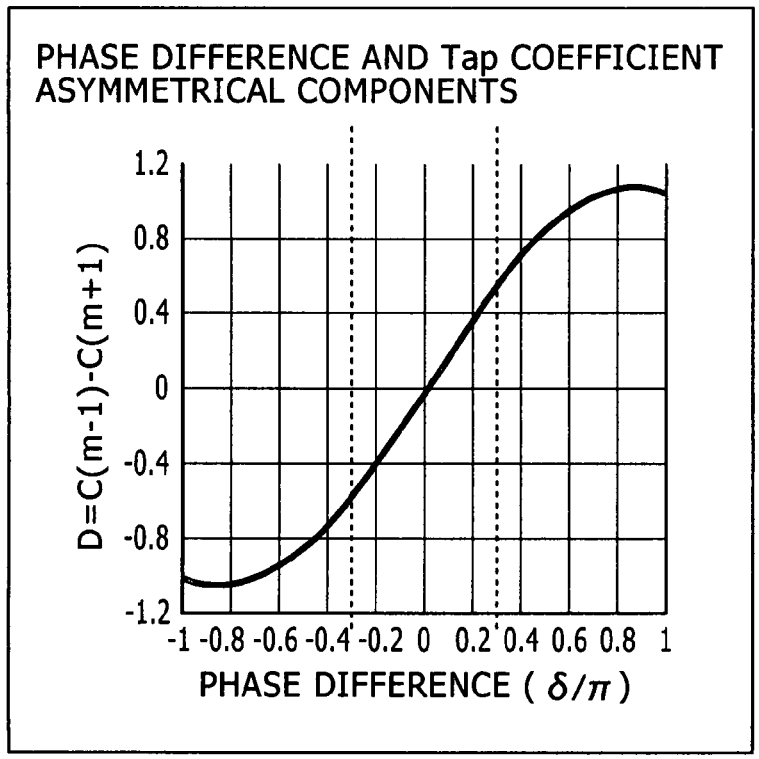
FIG. 5 is a diagram illustrating a result of plotting of a relationship between a phase difference and an asymmetric component of tap coefficients based on a sinc function.

FIG. 5 illustrates a result of plotting of a relationship between the phase difference (δ/π) and the asymmetric component D=C(m−1)−C(m+1). It is to be noted that, in FIG. 5, the axis of abscissa indicates the phase difference (δ/π) and the axis of ordinate indicates the asymmetric component D.

As can be seen from FIG. 5, the asymmetric component D within the range of −π<δ<π has a positive value when the polarity of the phase difference (δ/π) is negative, but has a positive value when the polarity of the phase difference (δ/π) is positive. Thus, the asymmetric component D correctly indicates the polarity of the phase difference between the two input signals. On the other hand, within the range of −0.8π<δ<0.8π, there is a tendency that the absolute value of the asymmetric component D increases as the absolute value of the phase difference (δ/π) increases. Particularly within the range of −0.3π<δ<0.3π indicated by two vertical broken lines in FIG. 5, the asymmetric component D and the phase difference (δ/π) have a substantially linear relationship to each other.

From the foregoing, it can be recognized that the asymmetric component D substantially accurately represents the polarity and the value of the phase difference between two input signals to the adaptive equalizer 16. From this, it can be recognized that the asymmetric component D can be used sufficiently practically as a signal representative of the phase difference between two signals in the DPD (Differential Phase Detection) method, that is, as a tracking error signal.

It is to be noted that, while, in the production system for the tracking error signal TE in the present embodiment, sampling data as the signal A+C and the signal B+D can be obtained by asynchronous sampling by the A/D converters 15a and 15b, according to setting of the sampling period of the A/D converters 15a and 15b, the range of the value obtained actually as the phase difference between the signal A+C and the signal B+D, that is, the asymmetric component D, can be adjusted.

In particular, by setting of the sampling period of the A/D converters 15a and 15b, it is possible to adjust the range of the value to be obtained actually as D=C(m−1)−C(m+1) so as to be set within a range within which such a linear relationship as described hereinabove as in the range from −0.3π<δ<0.3π is exhibited.

It is to be noted, however, that, since it is estimated that the value of the phase difference between the signal A+C and the signal B+D which may possibly appear in actual tracking servo control does not become so high as −0.8π>δ or δ<0.8π as in FIG. 5, even if such adjustment into the range within which such a linear relationship as described hereinabove is exhibited is not performed particularly, appropriate tracking servo controlling operation based on the asymmetric component D can be performed. Actually, a result of an experiment was obtained that tracking servo control can be performed appropriately using the tracking error signal TE in the reproduction apparatus 1 according to the present embodiment.

It is to be noted that, although the value of the phase difference between the signal A+C and the signal B+D is comparatively great upon pull-in of tracking servo, if it is taken into consideration that it is only necessary upon pull-in for comparatively rough control (polarity control between the positive and the negative) to be performed and that the asymmetric component D represents the polarity of the phase difference correctly over the overall region as seen in FIG. 5, then it is recognized that it is not particularly necessary to perform such adjustment according to the sampling period as described hereinabove also upon pull-in.

Figure 6:
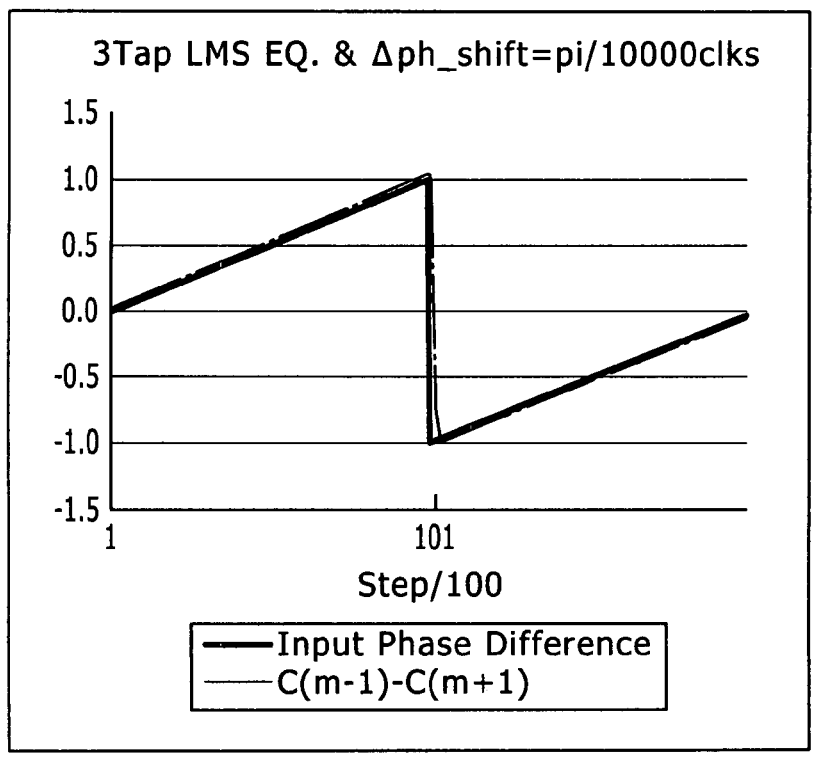
FIG. 6 is a diagram illustrating a result of a simulation of the behavior of the asymmetric component of the tap coefficients when the phase difference between an input waveform and a target waveform in a FIR type adaptive waveform equalizer having three taps is varied together with the lapse of time.

FIG. 6 illustrates a result of a simulation of the behavior of the asymmetric component D of the tap coefficients C when the phase difference between the input waveform and the target waveform in a FIR type adaptive waveform equalizer having three taps like the adaptive equalizer 16 of the reproduction apparatus 1 of the present embodiment is varied together with the lapse of time. It is to be noted that, in FIG. 6, the phase difference between the input waveform and the target waveform is indicated by a solid line, and the asymmetric component D (C(m−1)−C(m+1)) is indicated by a broken line.

From FIG. 6, it can be seen that, in the present embodiment, the number of tap coefficients of the FIR filter is so small as three, and although a period in which a steep variation is provided intentionally to the phase difference between the two waveforms is provided, the asymmetric component D follows up the steep variation well.

Also from the simulation result described, the validity of the present embodiment is proved.

Figures 7A, 7B:
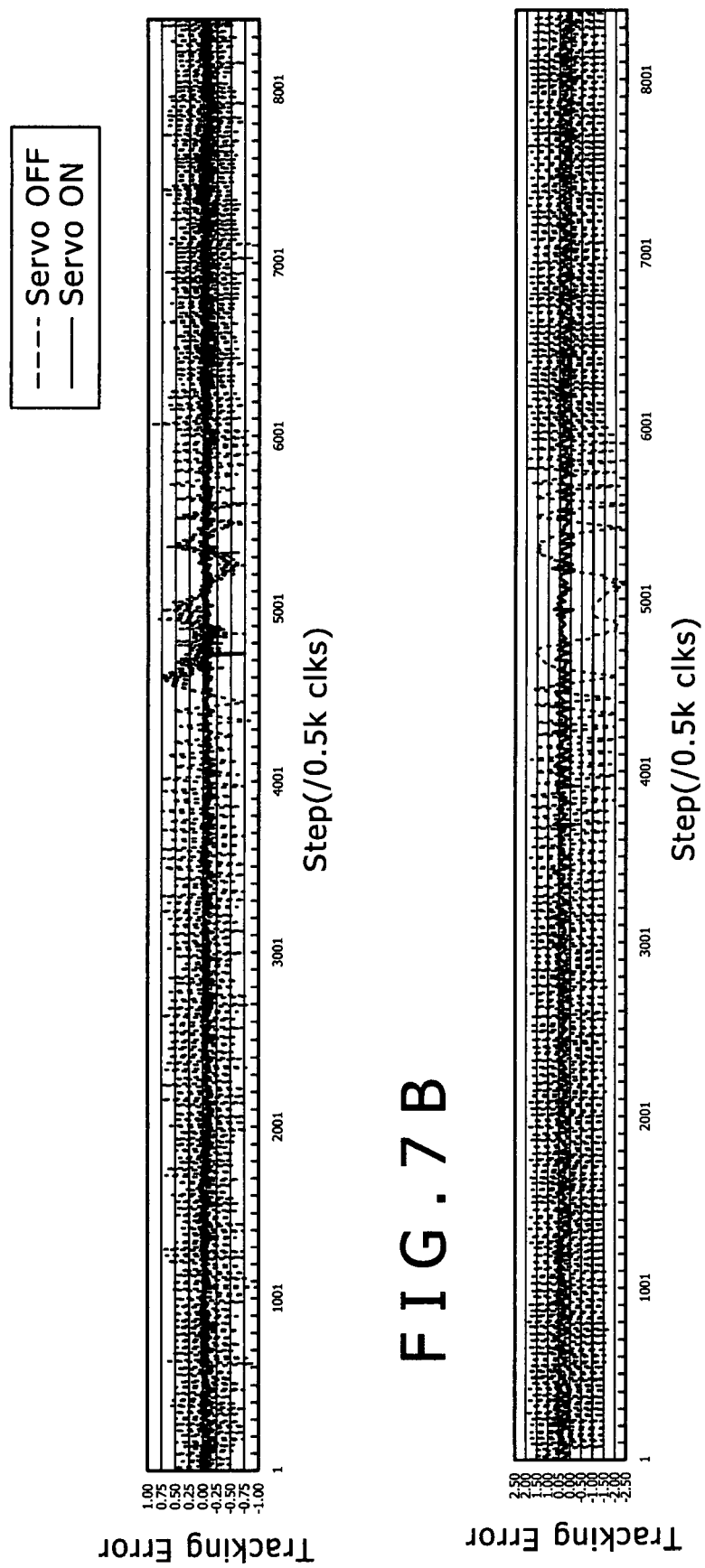
FIGS. 7A and 7B are waveform diagrams showing the waveform of a tracking error signal produced by an existing DPD method and the waveform of a tracking error signal produced by the reproduction apparatus for comparison, respectively.

FIG. 7A illustrates the waveform of a tracking error signal produced by a conventional DPD method, and FIG. 7B illustrates the waveform of the tracking error signal TE produced by the reproduction apparatus 1 of the present embodiment for comparison.

It is to be noted that, in FIGS. 7A and 7B, a broken line indicates a waveform obtained when tracking servo control is off, that is, a traverse signal, and a solid line indicates a waveform when tracking servo control is on.

Further, the experiment result of FIG. 7B is a result of a simulation conducted making use of detector detection signals obtained by a reproduction apparatus which adopts a conventional DPD method used to obtain the experiment result of FIG. 7A. In other words, FIG. 7B shows a waveform of the tracking error signal TE obtained finally by the asymmetric component calculation section 17 when detection signals of a four-element detector provided in such a conventional reproduction apparatus as described above are inputted to the matrix circuit 3 of the reproduction apparatus 1 of the present embodiment shown in FIG. 3.

Further, in order to obtain the experiment results illustrated in FIGS. 7A and 7B, an optical disk D having a recording capacity of approximately 35 GB by one layer which is a higher recording density than a currently available BD was used.

As can be recognized from the comparison between FIGS. 7A and 7B, the tracking error signal TE by the reproduction apparatus 1 of the present embodiment illustrated in FIG. 7B contains noise components somewhat reduced from those of the tracking signal according to the conventional DPD method illustrated in FIG. 7A.

From this, it can be recognized that the tracking error signal TE obtained by the reproduction apparatus 1 of the present embodiment exhibits accuracy equal to or higher than that by the existing system.

As described above, the reproduction apparatus 1 of the present embodiment includes the adaptive equalizer 16 which inputs one and the other of two signals (A+C, B+D) produced so as to exhibit a phase difference when the laser spot is displaced from the center portion of a track similarly as in an existing DPD method as an input waveform and a target waveform, respectively. Then, the phase difference between the two signals can be detected by calculating the asymmetric component D of the tap coefficients C of the adaptive equalizer 16. In other words, the tracking error signal TE according to a DPD method can be obtained thereby.

Further, in the reproduction apparatus 1 of the present embodiment, the servo circuit 4 performs driving control of the biaxial mechanism DC (tracking coil) based on the tracking error signal TE as the asymmetric component D which represents the phase difference between the two signals. In other words, by such driving control, such tracking control as tracking servo control and pull-in of tracking servo is performed.

As described above, with the reproduction apparatus 1 of the present embodiment, since the phase difference between the two signals (A+C, B+D) can be detected by calculating the asymmetric component D of the tap coefficients C of the adaptive equalizer 16, when to detect the phase difference between the two signals, there is no necessity to detect the zero-cross timings of the individual signals. In this regard, the reproduction apparatus 1 of the present embodiment is different from the existing reproduction apparatus.

Consequently, even if a sufficient reproduction signal amplitude (amplitude of the detection signals from the four-element detector 11) is not obtained as a result of enhancement of the linear direction recording density of the optical disk D, the phase difference between the two signals can be detected appropriately. This achieves enhancement of the accuracy of the tracking error signal TE and also achieves enhancement of the accuracy of the tracking control (particularly the tracking servo control). Further, where the tracking servo control is enhanced in this manner, also deterioration of the reproduction performance can be suppressed as much.

Figure 13:
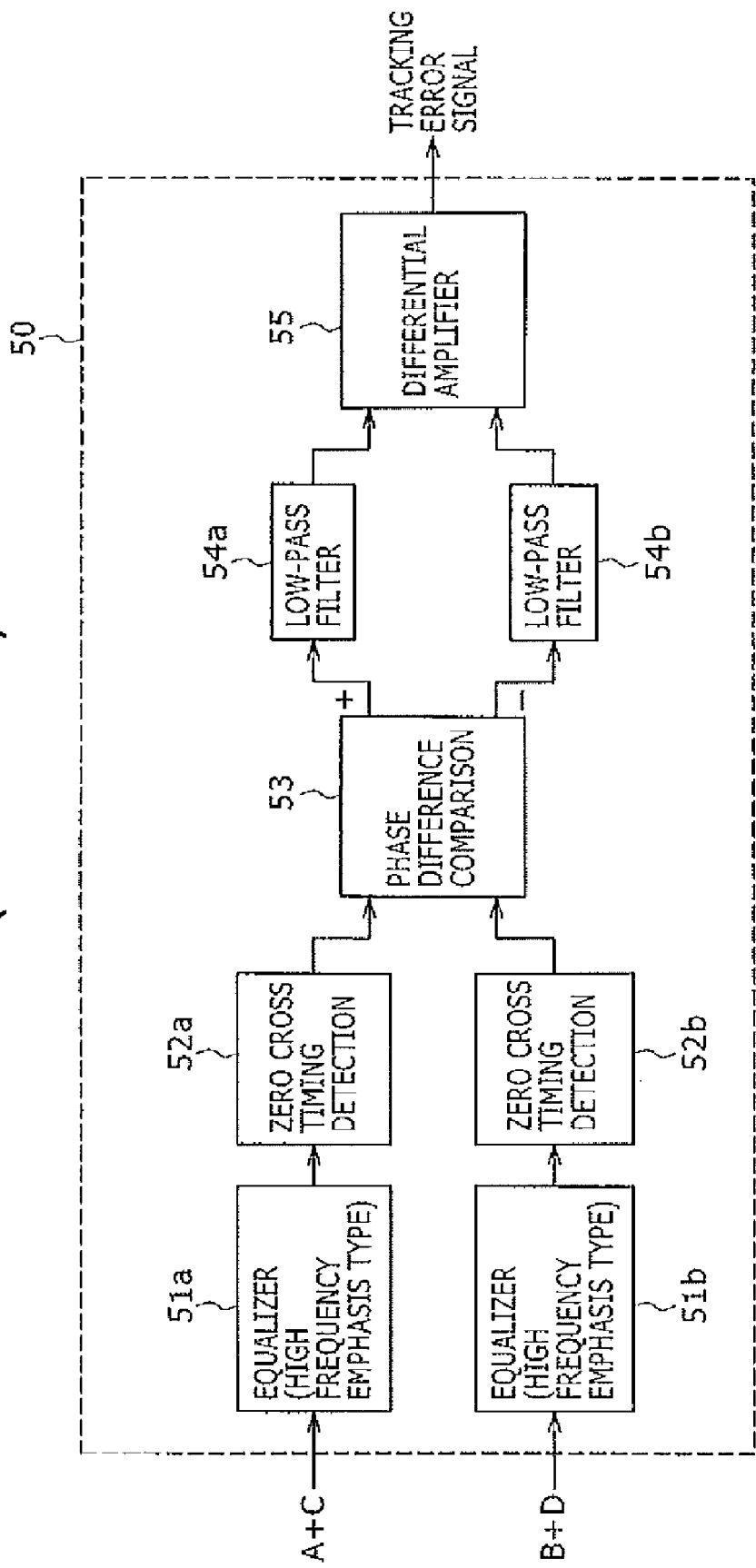
FIG. 13 is a block diagram showing a configuration of an existing tracking error signal production circuit according to the existing DPD method.

Further, since it is unnecessary to detect the zero-cross timings as described above, the necessity for equalizers (refer to equalizers 51a and 51b in FIG. 13) for waveform shaping the signals which were required in the related art in order to assure high detection accuracy of the zero-cross timings can be eliminated. As a result, reduction in circuit space and reduction in cost can be anticipated when compared with an existing circuit for tracking signal production.

Further, as can be recognized from the foregoing description, with the reproduction apparatus 1 of the present embodiment, information of the phase difference between two signals can be obtained at all sampling points other than the zero-cross timings. Consequently, higher speed processing of tracking servo control than ever can be anticipated. Furthermore, where information of the phase difference can be obtained at all sampling points other than the zero-cross timings in this manner, also the accuracy in tracking servo control can be enhanced.

Further, as can be recognized from the configuration shown in FIG. 3, the tracking error signal TE in the reproduction apparatus 1 of the present embodiment can be produced by performing only arithmetic operation by a digital synchronization circuit for data after A/D conversion by asynchronous sampling of the detection signals from the four-element detector 11.

Second Embodiment

Figure 8:
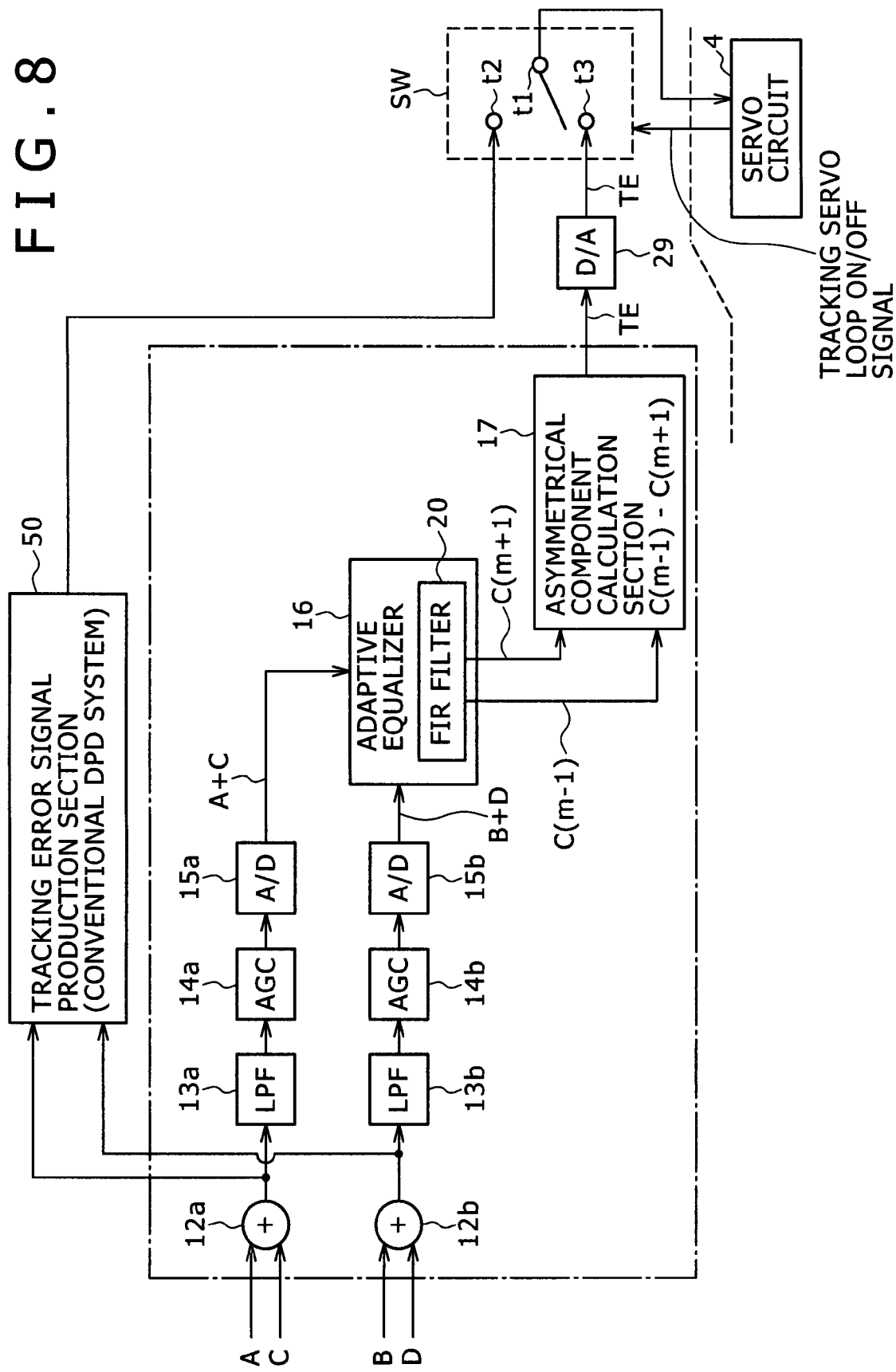

FIG. 8 shows a configuration of a production system for a tracking error signal TE according to a second embodiment of the present invention.

It is to be noted that, similarly to FIG. 3, also FIG. 8 only shows a reproduction system for a tracking error signal in the matrix circuit 3 shown in FIG. 1 but omits other components of the reproduction apparatus 1. Further, it is described here for the confirmation that also in the embodiments hereinafter described, the reproduction apparatus 1 has a general configuration similar to that described hereinabove with reference to FIG. 1.

In the second embodiment, a tracking error signal according to an existing DPD method is used upon pull-in of tracking servo, but upon tracking servo control after the pull-in, a tracking error signal TE according to an asymmetric component D is used.

Referring to FIG. 8, also the matrix circuit 3 in the reproduction apparatus of the present embodiment includes the configuration as the production system for a tracking error signal TE described hereinabove with reference to FIG. 3, which is surrounded by an alternate long and short dash line in FIG. 8. In particular, the matrix circuit 3 includes adders 12a and 12b, low-pass filters 13a and 13b, automatic amplitude adjusters 14a and 14b, A/D converters 15a and 15b, an adaptive equalizer 16 and an asymmetric component calculation section 17.

The matrix circuit 3 further includes a D/A (Digital/Analog) converter 29 for converting a tracking error signal TE outputted from the asymmetric component calculation section 17 into an analog signal.

Further, in the matrix circuit 3, the sum signal (A+C) of detection signals of the detector element A and the detector element C obtained as a result of addition by the adder 12a and the sum signal (B+D) of detection signals from the detector element B and the detector element D obtained as a result of addition by the adder 12b are branched and supplied to a tracking error signal production section 50.

The tracking error signal production section 50 is configured so as to produce a tracking error signal by a conventional DPD method, that is, by a method of detecting a phase difference based on results of detection of zero-cross timings of sum signals. The particular internal configuration of the tracking error signal production section 50 may be similar to that, for example, of the tracking error signal production section 50 described hereinabove with reference to FIG. 13.

A tracking error signal outputted from the tracking error signal production section 50 is supplied to a tap T2 of a switch SW shown in FIG. 8. Meanwhile, the tracking error signal TE D/A converted by the error calculation section 28 described hereinabove is supplied to another tap T3 of the switch SW.

The switch SW is a two-contact switch which can select one of the tap T2 and the tap T3 with respect to a further tap T1 shown in FIG. 8. In this instance, the output of the tap T1 makes a tracking error signal outputted from the matrix circuit 3 and is supplied to the servo circuit 4 as seen in FIG. 8.

Further, switching control of the switch SW is performed in response to a tracking servo loop ON/OFF signal from the servo circuit 4. The tracking servo loop ON/OFF signal indicates an ON/OFF state of the tracking servo loop.

As well known in the art, the servo circuit 4 includes a switch for switching the tracking servo loop ON/OFF in response to ON/OFF switching of the tracking servo control. Thus, in the servo circuit 4, the tracking servo loop can be switched ON/OFF by performing ON/OFF control of the switch.

In the second embodiment, the control signal for switching the tracking servo loop ON/OFF is branched in the servo circuit 4 and supplied as the tracking servo loop ON/OFF signal also to the switch SW. If the tracking servo loop ON/OFF signal indicates the OFF state, then the switch SW selects the tap T2, but if the tracking servo loop ON/OFF signal indicates the ON state, then the switch SW selects the tap T3.

Thus, if a signal for switching off the tracking servo loop for pull-in of tracking servo is obtained as the tracking servo loop ON/OFF signal described above, then the tap T2 of the switch SW is selected. Consequently, upon pull-in of tracking servo, a tracking error signal based on a conventional DPD method from the tracking error signal production section 50 is supplied to the servo circuit 4.

On the other hand, if a signal for switching ON the tracking servo loop is obtained as the tracking servo loop ON/OFF signal in order to start tracking servo control after the pull-in of tracking servo, then the tap T3 of the switch SW is selected. Consequently, upon tracking servo control, the tracking error signal TE based on the asymmetric component D calculated by the asymmetric component calculation section 17 is supplied to the servo circuit 4.

In this manner, with the second embodiment, pull-in control of tracking servo can be performed based on a tracking error signal by a conventional DPD method, and later tracking servo control can be performed based on the tracking error signal TE based on the asymmetric component D.

Consequently, while conventionally available accuracy is assured as the pull-in accuracy of tracking servo, tracking servo control can be performed with a higher degree of accuracy than ever based on the tracking error signal TE.

It is to be noted that, while, in FIG. 8, the error calculation section 28 is inserted on the tracking error signal TE side outputted from the asymmetric component calculation section 17, where the servo circuit 4 on the following stage is configured so as to be ready for a tracking error signal in the form of a digital signal, an A/D converter for analog to digital conversion should be inserted on the tracking error side outputted from the tracking error signal production section 50.

Third Embodiment

Figure 9:
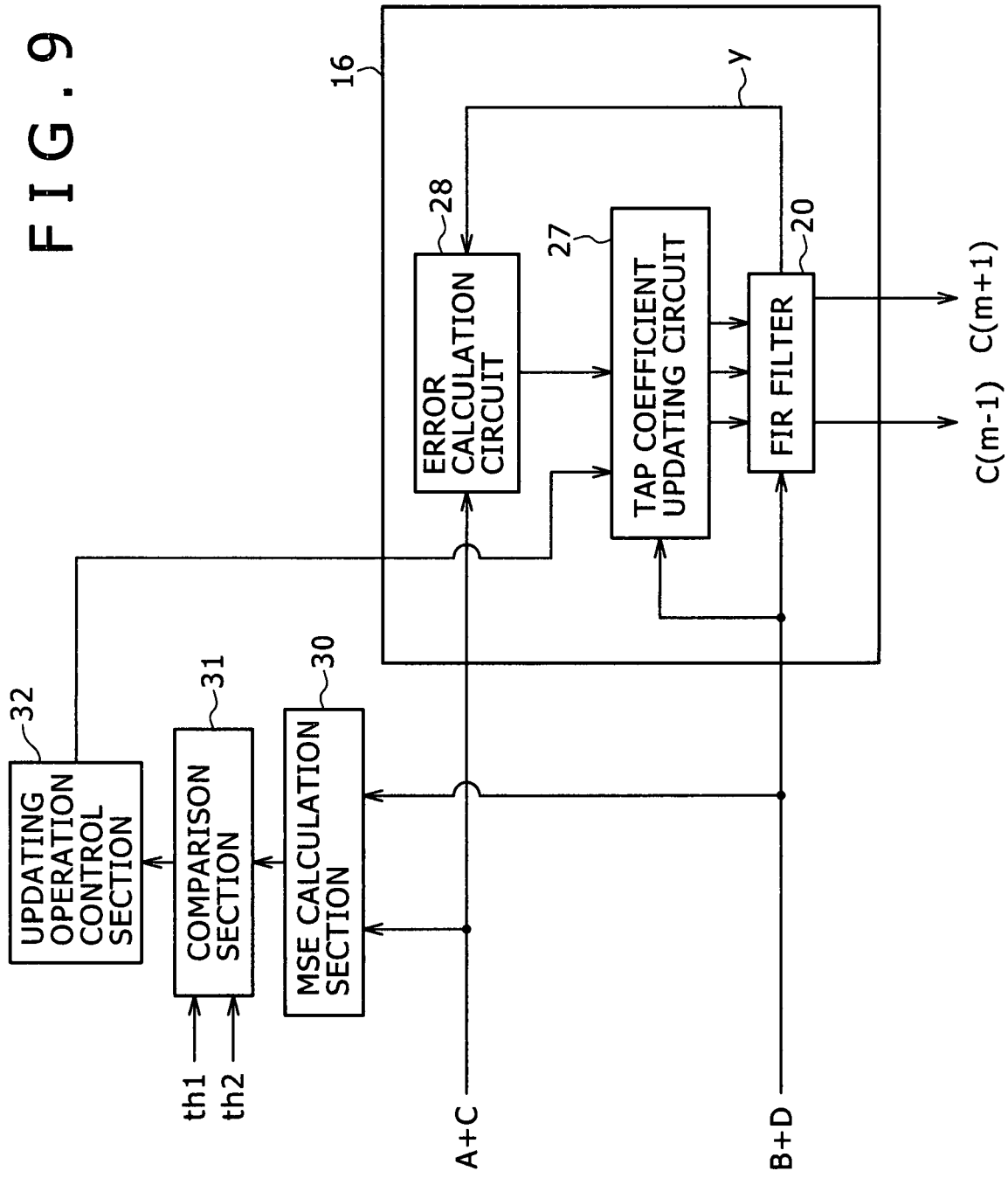

FIG. 9 shows a configuration of a production system for a tracking error signal TE according to a third embodiment of the present invention.

Figure 2:
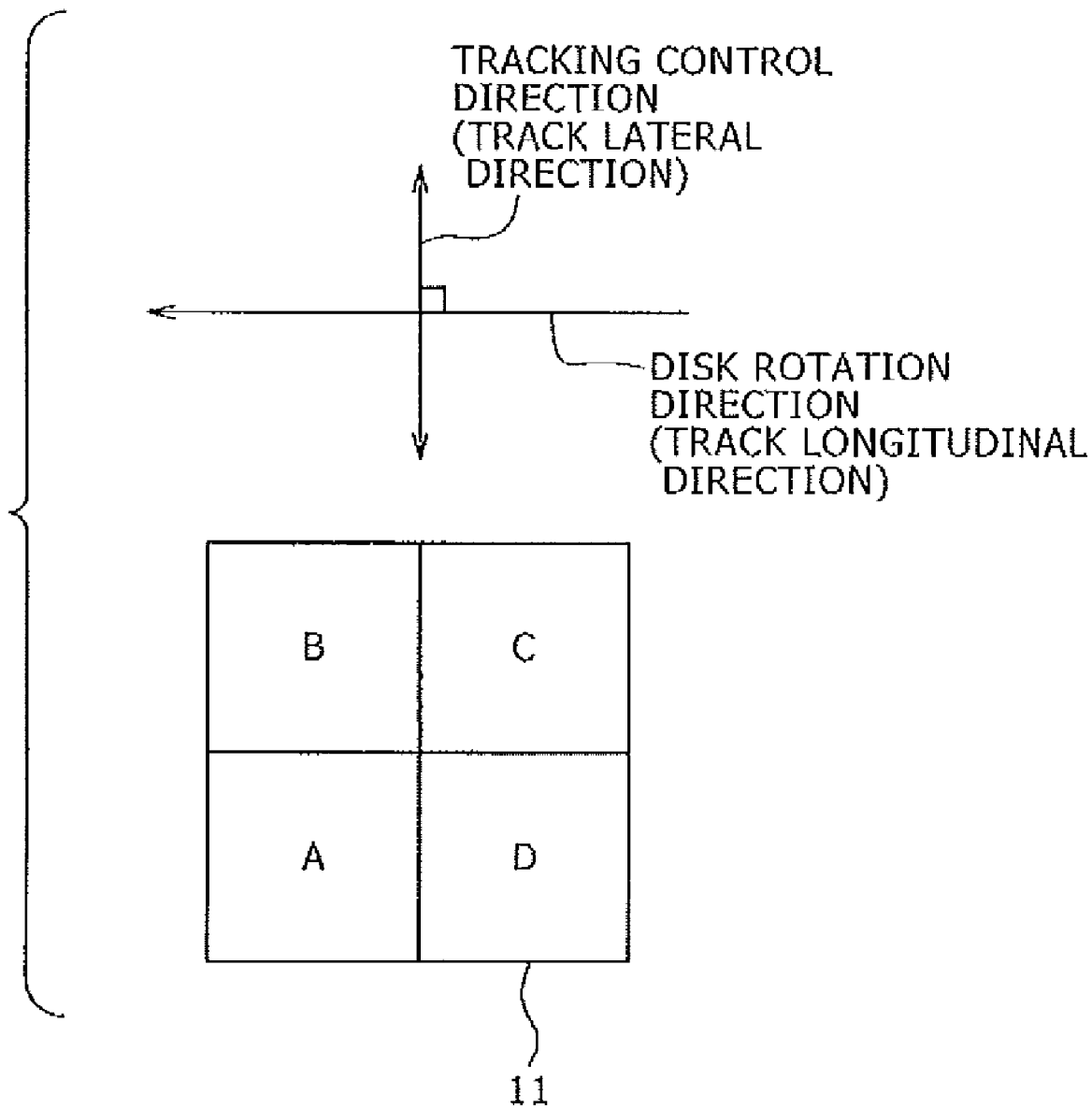
FIG. 2 is a diagrammatic view illustrating arrangement of a four-element detector provided in the reproduction apparatus.

It is to be noted that, in FIG. 9, only the adaptive equalizer 16 provided in the matrix circuit 3 shown in FIG. 2 and additional components of the third embodiment are shown while the other components are omitted.

According to the third embodiment, the updating operation of the tap coefficients C of the adaptive equalizer 16 is controlled in response to an error between the two signals inputted as an input waveform and a target waveform thereby to prevent the divergence of the adaptive equalizer 16.

Referring to FIG. 9, the signal A+C and the signal B+D supplied to the adaptive equalizer 16 are branched and supplied also to a mean square error (MSE) calculation section 30.

The MSE calculation section 30 performs arithmetic operation of, for example, "signal (A+C)−signal (B+D)" to calculate an error square mean value of the signals (A+C) and the signals (B+D). Then, a result of the calculation is outputted to a comparison section 31.

A threshold value th1 and another threshold value th2 illustrated in FIG. 9 are set to the comparison section 31. In this instance, the threshold value th1 and the threshold value th2 are set so as to have a relationship of th1>th2.

The comparison section 31 compares the two threshold values th1 and th2 and the error square mean value calculated by the MSE calculation section 30 with each other in magnitude and outputs a result of the comparison to an updating operation control section 32.

The updating operation control section 32 controls the updating operation of the tap coefficients C by the tap coefficient updating circuit 27 in the adaptive equalizer 16 based on the comparison result of the comparison section 31.

In particular, if the comparison result of the comparison section 31 indicates that the error square mean value from the MSE calculation section 30 is higher than the threshold value th1, then the updating operation control section 32 stops the updating operation of the tap coefficients C and controls the tap coefficient updating circuit 27 so as to reset the tap coefficients C (sets C(m) to C(m)=1 and sets all of the other tap coefficients to 0).

On the other hand, if the comparison result of the comparison section 31 indicates that the error square mean value from the MSE calculation section 30 is lower than the threshold value th2, then the updating operation control section 32 controls the tap coefficient updating circuit 27 so as to resume the updating operation of the tap coefficients C.

In the third embodiment having the configuration described above, such a situation that the adaptive equalizer 16 diverges can be prevented effectively even in a no-signal state which is provided by movement of the optical pickup OP between tracks, for example, in a pull-in process of tracking servo or in a situation wherein the reproduction signal quality is deteriorated significantly.

If the tap coefficients C of the adaptive equalizer 16 diverge, then even if the optical pickup OP arrives at a next track, the adaptive equalizer 16 does not converge and fails to obtain correction information of the phase error. However, according to the third embodiment, such a situation can be prevented effectively.

Fourth Embodiment

Figure 10:
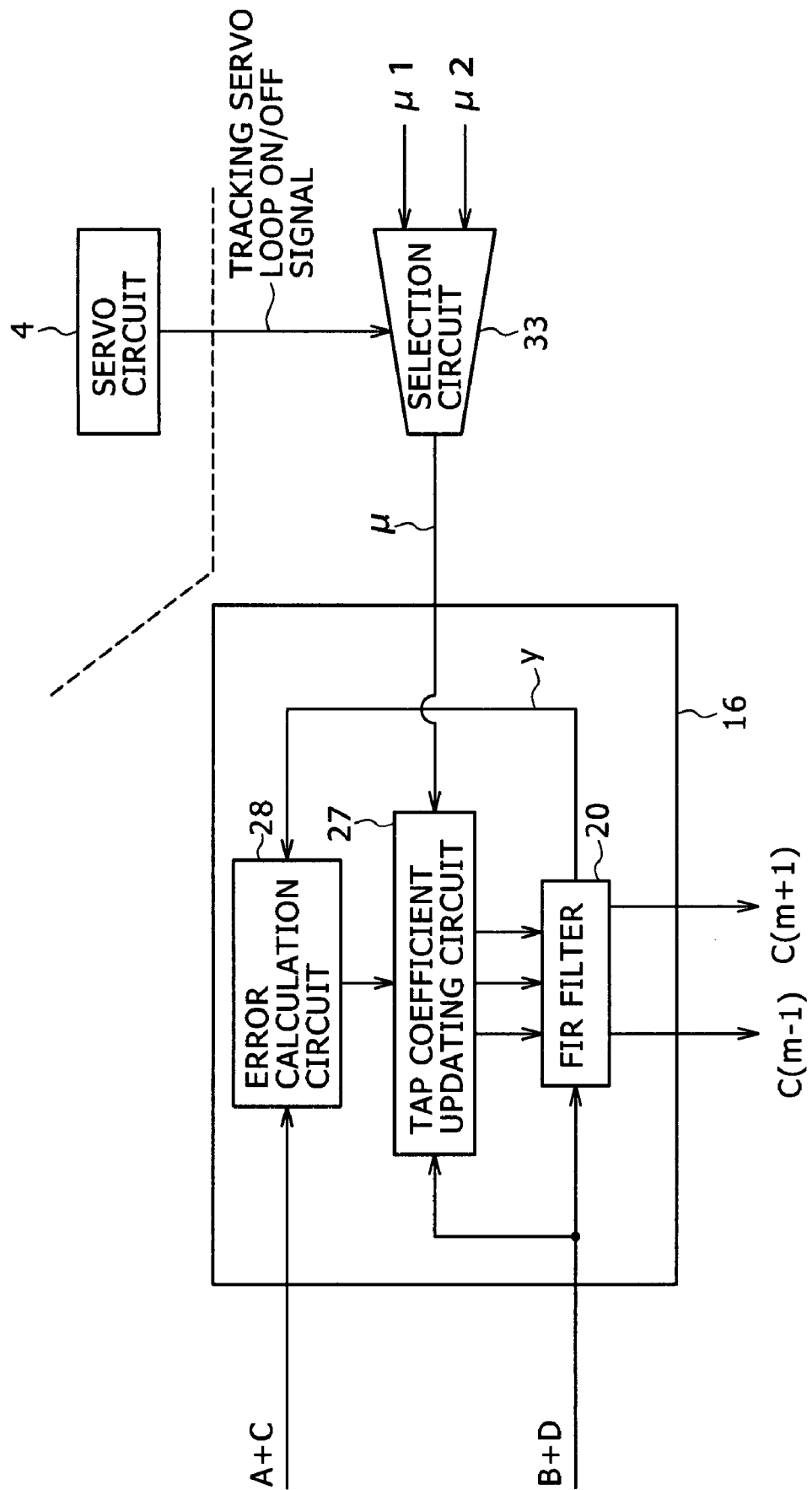

FIG. 10 shows a configuration of a reproduction system for a tracking error signal according to a fourth embodiment of the present invention.

It is to be noted that, also in FIG. 10, only the adaptive equalizer 16 provided in the matrix circuit 3 shown in FIG. 2 and additional components of the fourth embodiment are shown while the other components are omitted.

In the fourth embodiment, the updating coefficient μ of the adaptive equalizer 16 is set variably to achieve both of the enhancement of the accuracy of tracking servo control and enhancement of the pull-in performance of tracking servo.

Referring to FIG. 10, the matrix circuit 3 shown includes a selection circuit 33. An updating coefficient μ1 and another updating coefficient μ2 are set to the selection circuit 33. The updating coefficients μ1 and μ2 are set so as to satisfy a relationship of μ1>μ2.

Further, a tracking servo loop ON/OFF signal is supplied from the servo circuit 4 to the selection circuit 33. If a tracking serve loop OFF signal is supplied as the tracking servo loop ON/OFF signal upon pull-in of tracking servo to the selection circuit 33, then the selection circuit 33 selects the updating coefficient μ1 from between the updating coefficients μ1 and μ2 and outputs the selected updating coefficient μ1 as an updating coefficient μ to be set to the adder 26 in the adaptive equalizer 16.

On the other hand, a tracking serve loop ON signal is supplied as the tracking servo loop ON/OFF signal upon tracking servo control to the selection circuit 33, the selection circuit 33 selects the updating coefficient μ2 and outputs the selected updating coefficient μ2 as an updating coefficient μ to be set to the adder 26.

By such selection operation of an updating coefficient μ by the selection circuit 33 as described above, upon pull-in of tracking servo, a comparatively high value is set as an updating coefficient μ for the tap coefficient updating circuit 27. Where a comparatively high value is set as the updating coefficient μ in this manner, the adaptive equalizer 16 converges in a comparatively short period of time. Consequently, the adaptive equalizer 16 can follow up also the signal A+C and the signal B+D which vary at a comparatively high speed upon pull-in of tracking servo. As a result, the pull-in performance can be enhanced.

On the other hand, upon tracking servo control, since a comparatively low value is set as the updating coefficient μ for the tap coefficient updating circuit 27, the accuracy of the convergence value of the adaptive equalizer 16 and hence the accuracy of the asymmetric component D obtained by the asymmetric component calculation section 17 can be enhanced as much. Consequently, since it is possible to suppress unnecessary high-frequency noise of the tracking error signal TE to enhance the S/N ratio of the tracking error signal TE, also the accuracy in tracking servo control can be enhanced as much.

Fifth Embodiment

Figure 11A:
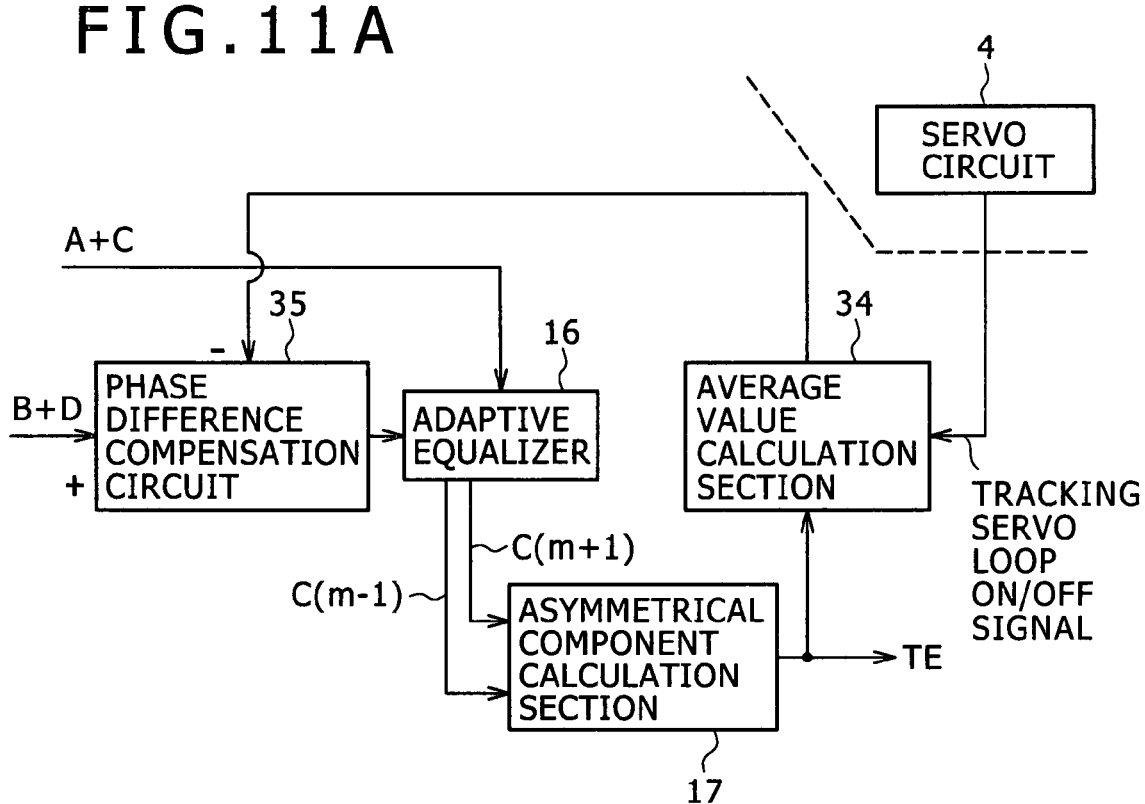
Figure 11B:
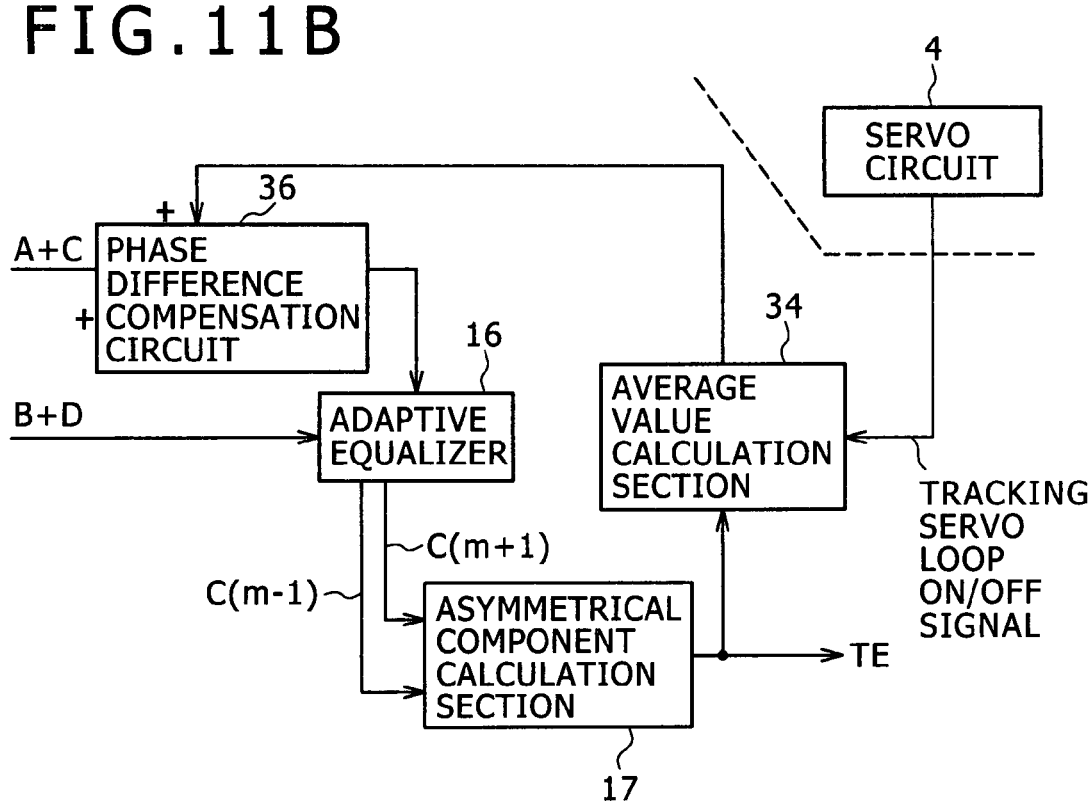

FIGS. 11*a* and 11*b* show configurations of production systems for a tracking error signal according to a fifth embodiment of the present invention.

It is to be noted that, in FIGS. 11*a* and 11*b*, only the adaptive equalizer 16 and the asymmetric component calculation section 17 provided in the matrix circuit 3 shown in FIG. 2 and additional components of the fifth embodiment are shown while the other components are omitted.

In the fifth embodiment, in order to cope with a case wherein a fixed phase difference component is produced in a detection signal from the four-element detector 11, for example, by distortion, skew or the like of the beam spot, a configuration for removing such a phase difference component as described is provided.

In particular, FIG. 11*a* shows a configuration wherein a circuit for phase compensation is inserted on the signal B+D side supplied as an input waveform to the adaptive equalizer 16. Meanwhile, FIG. 11*b* shows another configuration wherein a circuit for phase compensation is inserted on the signal A+C side supplied as a target waveform conversely to the adaptive equalizer 16.

The configurations shown in FIGS. 11*a* and 11*b* commonly include an average value calculation section 34 for calculating such a fixed phase difference offset component as described above. A tracking error signal TE (asymmetric component D) from the asymmetric component calculation section 17 is branched and supplied to the average value calculation section 34. Also a tracking servo loop ON/OFF signal from the servo circuit 4 is supplied to the average value calculation section 34.

The average value calculation section 34 calculates an average value of values of the tracking error signal TE supplied from the asymmetric component calculation section 17 only when a tracking servo loop OFF signal is supplied as the tracking servo loop ON/OFF signal described hereinabove to the average value calculation section 34.

Thus, the average value calculation section 34 calculates a sample average value regarding the tracking error signal TE (that is, a traverse signal) in a free-running state when the tracking servo control is off. In other words, the average value calculation section 34 calculates a sample average value of the traverse signal as a value of a fixed phase difference offset component which appears between the signal A+C and the signal B+D.

Then, in the configuration example shown in FIG. 11*a*, the average value as the value of the fixed phase difference offset component calculated by the average value calculation section 34 is supplied to a phase difference compensation circuit 35 inserted in a line for the signal B+D side which is supplied as an input waveform to the adaptive equalizer 16.

The phase difference compensation circuit 35 changes the phase of the signal B+D supplied from the A/D converter 15*b* described hereinabove with reference to FIG. 3 by an amount corresponding to the value supplied from the average value calculation section 34. More particularly, if an average value having the + (positive) polarity is supplied from the average value calculation section 34, then the phase difference compensation circuit 35 delays the phase of the signal B+D by an amount corresponding to the absolute value of the average value. However, if an average value of the − (negative) polarity is supplied, then the phase difference compensation circuit 35 advances the phase of the signal B+D by an amount corresponding to the average value of the average value. Then, the phase difference compensation circuit 35 supplies the signal B+D obtained by such a phase conversion process as described above to the adaptive equalizer 16.

Consequently, a fixed phase difference offset component appearing between the signal A+C and the signal B+D can be removed.

Here, a relationship between the polarity of the average value calculated by such an average value calculation section 34 as described above and the polarity of the phase difference which appears between the signal A+C and the signal B+D are described additionally. First, that a + value is calculated by the average value calculation section 34 signifies that the tracking error signal TE as a traverse signal obtained by the asymmetric component calculation section 17 has an offset on the + side. Then, that a + component appears in the tracking error signal TE in this manner signifies that the coefficient C(m+1) inputted to the asymmetric component calculation section 17 has a higher value.

According to the description given hereinabove with reference to FIG. 4, that the tap coefficient C(m+1) is higher in this manner signifies that, since waveform equalization is performed in a direction in which the phase of the signal B+D of the input waveform is delayed, the signal B+D has an advanced phase. From this, if a + average value is obtained by the average value calculation section 34, then this signifies that a fixed phase different offset component is produced in a direction (polarity) in which the phase of the signal B+D is advanced.

On the contrary, if a − value is calculated by the average value calculation section 34, then this signifies that the tap coefficient C(m−1) inputted to the asymmetric component calculation section 17 is higher. Further, this signifies that, since waveform equalization is performed in a direction in which the phase of the signal B+D of the input waveform is advanced, the signal B+D has a delayed phase. From this, if a − average value is obtained by the average value calculation section 34, then this signifies that a fixed phase different offset component is produced in the polarity in which the phase of the signal B+D is delayed.

Therefore, according to such a phase difference compensation circuit 35 as described above, where a fixed phase difference component is produced in a direction in which the signal B+D is advanced and a + value is obtained as the average value, the phase of the signal B+D can be delayed by an amount corresponding to the average value (absolute value). In other words, the fixed phase difference component can be removed thereby.

On the contrary, where a fixed phase difference component is produced in a direction in which the signal B+D is delayed and a − value is obtained as the average value, the phase of the signal B+D can be advanced by an amount corresponding to the average value (absolute value). Accordingly, also in this instance, the fixed phase difference component can be removed.

In the other configuration example of FIG. 11b, an average value calculated by the average value calculation section 34 is supplied to a phase difference compensation circuit 36 inserted in the line for the signal A+C supplied as a target waveform to the adaptive equalizer 16.

The phase difference compensation circuit 36 is configured conversely to the phase difference compensation circuit 35. In particular, the phase difference compensation circuit 36 is configured such that, if an average value of the + (positive) polarity is supplied from the average value calculation section 34, then the phase of the signal A+C is delayed by an amount corresponding to the average value (absolute value). On the other hand, if an average value of the − (negative) polarity is supplied, then the phase of the signal A+C is advanced by an amount corresponding to the average value (absolute value).

In particular, where the phase of the other signal A+C is adjusted based on the average value from the average value calculation section 34, the phase difference compensation circuit 36 adjusts the phase in a relationship opposite to that by the phase difference compensation circuit 35 described above. By this adjustment, the adjustment of the phase difference between the signal A+C and the signal B+D can be performed similarly to that performed as described hereinabove with reference to FIG. 11a. As a result, also by the configuration of FIG. 11b, a fixed phase difference component which appears between the signal A+C and the signal B+D can be removed.

If a fixed phase difference offset component appearing between the signal A+C and the signal B+D can be removed in this manner, then an offset component can be prevented from overlapping with the tracking error signal TE as the asymmetric component D calculated by the asymmetric component calculation section 17. Consequently, even where a fixed phase difference offset component is caused by distortion, skew or the like of the beam spot, tracking servo control of a high degree of accuracy can be implemented.

Further, if a fixed phase difference offset component appearing between two different signals can be removed in this manner, then the tracking error signal TE can be detected with increased probability within a preferable characteristic range of the phase difference sensitivity curve shown in FIG. 5 such as, for example, the range of −0.3π<δ<0.3π in FIG. 5. Alto in this regard, tracking servo control of a high degree of accuracy can be implemented.

It is to be noted that, while, in the fifth embodiment, a circuit for phase compensation is inserted only in one of the lines for the signal A+C and the signal B+D, it may otherwise be inserted in the lines for both signals. Also in this instance, similar effects can be achieved only if a configuration is provided which adjusts the phases of the two signals relative to each other so as to remove the fixed phase difference offset component.

Further, while a fixed phase difference offset component is detected based on the tracking error signal TE as a traverse signal, another method may be taken as a detection method for such a fixed phase difference offset component as described above.

Or, another configuration may be adopted that, in a case wherein a fixed phase difference offset component is known in advance or in a like case, the fixed value is supplied to a phase difference compensation circuit.

<Modifications>

While several preferred embodiments of the present invention have been described above, the present invention is not limited to the embodiments described above.

For example, in the embodiments described above, the number of taps of a FIR type adaptive waveform equalizer is three, and where the central tap coefficient is represented by C(m), the asymmetric component D is calculated by calculating the difference between the tap coefficients C(m−1) and C(m+1). However, also where the number of taps is a plural odd number, the phase difference between two input signals can be detected similarly by calculating the difference between preceding and succeeding tap coefficients C(m−1) and C(m+1) with reference to the central tap coefficient C(m).

Or, where the number of taps is an odd number greater than 3, the asymmetric component D can be calculated, for example, also by calculating the difference between the sum total of all tap coefficients C preceding to the central tap coefficient C(m) and the sum total of all tap coefficients C succeeding the central tap coefficient C(m). Or, the asymmetric component D can be calculated by calculating the difference between a tap coefficient C preceding by a predetermined number with respect to the central tap coefficient C(m) and another tap coefficient C succeeding by the predetermined number with respect to the central tap coefficient C(m).

Anyway, only it is necessary for the asymmetric component D to be calculated so as to represent to which one of preceding/succeeding tap coefficients with respect to the central tap coefficient C(m) there is some one-sidedness in weighting. Thus, there is no particular limitation to the method of calculation of the asymmetric component D.

Further, in the embodiments described above, the four-element detector 11 which includes the detector elements A, B, C and D disposed in such a positional relationship as described hereinabove with reference to FIG. 2 is used to input the signal A+C and the signal B+D as input signals to the adaptive equalizer 16 (FIR type adaptive waveform equalizer). However, the reproduction apparatus and the tracking controlling method according to the present invention can be applied widely where a detection method for reflected light considered as a DPD method is adopted.

In particular, the present invention can be applied suitably where first and second signals are obtained which are produced based on detection signals from a detector composed of two ore more detector elements such that they exhibit a phase difference when a laser spot is displaced from the center portion of a track on an optical disk recording medium.

Further, while, in the embodiments described above, a popular LMS algorithm is adopted as the waveform equalization algorithm for a FIR type adapted waveform equalizer, the present invention can be applied suitably also where another waveform equalization algorithm is adopted.

Further, while, in the embodiments described above, the operations of the adaptive equalizer 16 and the asymmetric component calculation section 17 for producing a tracking error signal TE are implemented by hardware, they can be implemented also by software processing.

Similarly, the operations of the MSE calculation section 30, comparison section 31 and updating operation control section 32 in the third embodiment, the selection circuit 33 in the fourth embodiment and the average value calculation section 34 and the phase difference compensation circuits 35 and 36 in the fifth embodiment can be implemented by software processing.

Further, while, in the embodiments described above, the present invention is applied to a reproduction apparatus which can reproduce only a ROM disk for reproduction only, it can be applied suitably also where a signal recorded on a recordable disk is reproduced.

Further, the present invention can be applied suitably also to a reproduction apparatus which can not only reproduce but also record an optical disk recording medium, that is, to a recording and reproduction apparatus. However, since the DPD method can be implemented only in a state wherein a signal or mark is recorded, also where the present invention is applied to a recording and reproduction apparatus in this manner, the production method for a tracking error signal according to the present invention is applied only upon reproduction of a signal recorded on an optical disk recording medium.

Further, in the embodiments described above, the phase detection apparatus and the phase detection method according to the present invention are applied to a reproduction system for a tracking error signal in a reproduction apparatus which performs at least reproduction of an optical disk recording medium. However, the phase detection apparatus and the phase detection method according to the present invention can be applied suitably to various applications which involve detection of the phase difference between two input signals, that is, first and second signals.

For example, also in other fields such as a communication field, a conventional technique of detecting the phase difference between two signals based on a result of detection of the zero-cross timing of the two signals may possibly fail to achieve a sufficiently high degree of accuracy in phase difference detection. If the phase detection technique according to the present invention is applied to such a case as just described, enhancement of the detection accuracy of the phase difference between two signals can be anticipated similarly.

While preferred embodiments of the present invention have been described using specific terms, such description is for illustrative purpose only, and it is to be understood that changes and variations may be made without departing from the spirit or scope of the following claims.

The invention claimed is:

1. A reproduction apparatus for performing at least reproduction for an optical disk recording medium, comprising:
   a head section including an objective lens configured to act as an output end of laser light to the optical disk recording medium and an input end of reflected light from the optical disk recording medium, a detector including at least two detection elements and configured to detect the reflected light obtained through said objective lens, and a tracking mechanism configured to hold said objective lens for movement at least in a tracking direction;
   a waveform equalization section configured to input first and second signals produced based on detection signals of said detection elements of said head section as a target waveform and an input waveform, respectively, such that a phase difference occurs when a laser spot based on the laser light is displaced from the center position of a track on the optical disk recording medium, to perform a waveform equalization process using a FIR filter so that the input waveguide may coincide with the target waveform;
   a phase difference detection section configured to perform a predetermined calculation based on predetermined tap coefficients of said FIR filter in said waveform equalization section to calculate an asymmetric component of the tap coefficients of said FIR filter thereby to detect a phase difference between the first and second signals; and
   a tracking controlling section configured to control said tracking mechanism based on the asymmetric component calculated by said phase difference detection section.

2. The reproduction apparatus according to claim 1, wherein said tracking controlling section executes tracking servo control as tracking control.

3. The reproduction apparatus according to claim 1, wherein said tracking controlling section executes pull-in control of tracking servo together with tracking servo control as tracking control.

4. The reproduction apparatus according to claim 1, further comprising:
   a tracking error signal production section configured to detect the phase difference between the first and second signal based on a result where zero cross timings of the first and second signals are detected to produce a second tracking error signal; and wherein
   said tracking controlling section executes pull-in control of tracking servo based on the tracking error signal produced by said tracking error signal production section and executes tracking servo control based on the asymmetric component.

5. The reproduction apparatus according to claim 1, further comprising:
   an error detection section configured to detect an error between the first and second signals; and
   a dispersion prevention controlling section configured to control updating operation of the tap coefficients in said waveform equalization section based on the error and a predetermined threshold value.

6. The reproduction apparatus according to claim 5, wherein said dispersion prevention controlling section performs, where the error exceeds a predetermined first threshold value, control for said waveform equalization section so that the updating operation of the tap coefficients is stopped and the tap coefficients are reset to initial values, and performs, when the error thereafter becomes less than a predetermined second threshold value, control for said waveform equalization section so that the updating operation of the tap coefficients is started.

7. The reproduction apparatus according to claim 1, wherein said tracking controlling section executes pull-in control of tracking servo together with the tracking servo control as tracking control;
   said reproduction apparatus further comprising an updating coefficient changeover section configured to change over an updating coefficient of said waveform equalization section in response to an on/off state of tracking servo control.

8. The reproduction apparatus according to claim 1, further comprising a phase difference adjustment section configured to adjust the phase difference between the first and second signals to be inputted to said waveform equalization section.

9. The reproduction apparatus according to claim 8, wherein said tracking controlling section executes pull-in control of tracking servo together with tracking servo control as tracking control, and said phase difference adjustment section is configured so as to calculate an average value of the asymmetric components calculated by said phase difference detection section in a state wherein the tracking servo control by said tracking controlling section is off and adjust the phase difference between the first and second signals based on the calculated average value.

10. A tracking controlling method for a reproduction apparatus which includes a head section which in turn includes an objective lens configured to act as an output end of laser light to an optical disk recording medium and an input end of reflected light from the optical disk recording medium, a detector including at least two detection elements and configured to detect the reflected light obtained through said objective lens, and a tracking mechanism configured to hold said objective lens for movement at least in a tracking direction, and which is configured to perform at least reproduction for the optical disk recording medium, comprising:

inputting first and second signals produced based on detection signals of said detection elements of said head section as a target waveform and an input waveform, respectively, such that a phase difference occurs when a laser spot based on the laser light is displaced from the center position of a track on the optical disk recording medium, to perform a waveform equalization process using a FIR filter so that the input waveguide may coincide with the target waveform;

performing a predetermined calculation based on predetermined tap coefficients of the FIR filter to calculate an asymmetric component of the tap coefficients of the FIR filter thereby to detect a phase difference between the first and second signals; and controlling the tracking mechanism based on the asymmetric component calculated at the phase difference detection step.

* * * * *